(12) United States Patent
Kitsukawa et al.

(10) Patent No.: US 11,921,196 B2
(45) Date of Patent: Mar. 5, 2024

(54) RADAR DEVICE, OBSERVATION TARGET DETECTING METHOD, AND IN-VEHICLE DEVICE

(71) Applicant: Mitsubishi Electric Corporation, Tokyo (JP)

(72) Inventors: Yusuke Kitsukawa, Tokyo (JP); Noriyuki Fukui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 17/365,417

(22) Filed: Jul. 1, 2021

(65) Prior Publication Data

US 2021/0325531 A1    Oct. 21, 2021

Related U.S. Application Data

(63) Continuation of application No. PCT/JP2020/004310, filed on Feb. 5, 2020.

(30) Foreign Application Priority Data

Feb. 12, 2019  (WO) .................. PCT/JP2019/004877

(51) Int. Cl.
*G01S 13/931* (2020.01)
*G01S 7/40* (2006.01)
*G01S 13/00* (2006.01)

(52) U.S. Cl.
CPC .......... *G01S 13/931* (2013.01); *G01S 7/4056* (2013.01); *G01S 2013/9318* (2020.01); *G01S 2013/93185* (2020.01); *G01S 2013/932* (2020.01)

(58) Field of Classification Search
None
See application file for complete search history.

(56) References Cited

U.S. PATENT DOCUMENTS 10,067,221 B2 *  9/2018  Ginsburg ................ G01S 7/352
11,175,376 B2 * 11/2021  Melzer .................. G01S 13/931
(Continued)

FOREIGN PATENT DOCUMENTS

JP       5-240947 A    9/1993
JP     10-253750 A    9/1998
(Continued)

OTHER PUBLICATIONS

International Search Report for PCT/JP2019/004877 dated Apr. 23, 2019.
(Continued)

*Primary Examiner* — Bernarr E Gregory
(74) *Attorney, Agent, or Firm* — Birch, Stewart, Kolasch & Birch, LLP

(57) ABSTRACT

A radar device includes: an electromagnetic noise detecting unit for detecting electromagnetic noise input to an ADC using digital data in a period when no radar signal is transmitted, among digital data output from the ADC; and an observation target detecting unit for detecting an observation target using digital data in a period when the radar signal has been transmitted, among the digital data output from the ADC, and the electromagnetic noise detected by the electromagnetic noise detecting unit.

10 Claims, 24 Drawing Sheets

(56) References Cited

U.S. PATENT DOCUMENTS

| | | | |
|---|---|---|---|
| 2007/0120731 A1* | 5/2007 | Kelly, Jr. | G01S 7/021 |
| | | | 342/159 |
| 2007/0188373 A1* | 8/2007 | Shirakawa | G01S 13/931 |
| | | | 342/159 |
| 2011/0074620 A1 | 3/2011 | Wintermantel | |
| 2011/0074621 A1 | 3/2011 | Wintermantel | |
| 2011/0080313 A1 | 4/2011 | Wintermantel et al. | |
| 2011/0080314 A1 | 4/2011 | Wintermantel | |
| 2011/0291875 A1* | 12/2011 | Szajnowski | G01S 13/34 |
| | | | 342/70 |
| 2012/0112955 A1 | 5/2012 | Ando et al. | |
| 2013/0106646 A1 | 5/2013 | Kitagawa | |
| 2017/0219689 A1* | 8/2017 | Hung | G01S 13/931 |
| 2019/0056476 A1* | 2/2019 | Lin | G01S 7/021 |

FOREIGN PATENT DOCUMENTS

| | | | | |
|---|---|---|---|---|
| JP | 2011-526373 A | 10/2011 | | |
| JP | 2012-103007 A | 5/2012 | | |
| JP | 2013-96903 A | 5/2013 | | |
| JP | 2019-15797 A | 9/2019 | | |
| WO | WO03/044560 A1 * | 5/2003 | | G01S 13/34 |

OTHER PUBLICATIONS

International Search Report for PCT/JP2020/004310 dated Apr. 14, 2020.

Japanese Notice of Reasons for Refusal, issued in JP Patent Application No. 2020-570209 dated Jan. 26, 2021.

* cited by examiner

RADAR DEVICE, OBSERVATION TARGET DETECTING METHOD, AND IN-VEHICLE DEVICE

CROSS REFERENCE TO RELATED APPLICATIONS

This application is a Continuation of PCT International Application No. PCT/JP2020/004310, filed on Feb. 5, 2020, which claims priority under 35 U.S.C. 119(a) to Patent Application No. PCT/JP2019/004877, filed in Japan on Feb. 12, 2019, all of which are hereby expressly incorporated by reference into the present application.

TECHNICAL FIELD

The present disclosure relates to a radar device for detecting an observation target, an observation target detecting method, and an in-vehicle device.

BACKGROUND ART

The following Patent Literature 1 discloses a radar device of a frequency-modulated continuous wave (FMCW) type.

The radar device disclosed in Patent Literature 1 divides a frequency-modulated (FM) signal into a transmission signal and a local signal, transmits the transmission signal as an electromagnetic wave, and receives, as a reflection wave, the electromagnetic wave reflected by a target.

The radar device disclosed in Patent Literature 1 measures the distance to the target from the spectrum of a beat signal obtained by mixing the reception signal of the reflection wave and the local signal.

The radar device disclosed in Patent Literature 1 performs the following processing in order to enable measurement of the distance to a true target by preventing false detection of a target even when an extraneous radio wave such as a transmission signal transmitted from another radar device mounted on an oncoming vehicle is received.

The radar device disclosed in Patent Literature 1 switches between a transmission mode for transmitting a transmission signal and a reception mode for receiving an extraneous radio wave without transmitting a transmission signal and stores, in a memory, the spectrum of a beat signal that is obtained in the reception mode.

The radar device disclosed in Patent Literature 1 eliminates the interference of extraneous radio waves by correcting the spectrum of the beat signal obtained in the transmission mode on the basis of the spectrum of the beat signal obtained in the reception mode that is stored in the memory and thereby prevents false detection of targets.

CITATION LIST

Patent Literature

Patent Literature 1: JP H5-240947 A

SUMMARY OF INVENTION

Technical Problem

In the radar device disclosed in Patent Literature 1, a mixer generates the beat signal by mixing the reception signal and the local signal, and an analog-to-digital (AD) converter converts the beat signal generated by the mixer into a digital signal.

The AD converter may receive electromagnetic noise less than or equal to, for example, the sampling frequency of the AD converter when the AD converter converts the beat signal generated by the mixer into a digital signal. As the electromagnetic noise, in addition to electromagnetic waves generated from any component of the radar device, electromagnetic waves arriving from the outside of the radar device are also conceivable.

The electromagnetic noise is superimposed on the beat signal when electromagnetic noise is input to the AD converter, and thus there is a disadvantage that the detection accuracy of a target is deteriorated when the spectrum of the beat signal obtained in the transmission mode is corrected simply on the basis of the spectrum of the beat signal obtained in the reception mode.

The present disclosure is made in order to solve the above-mentioned disadvantage, and an object of the present invention is to obtain a radar device, an observation target detecting method, and an in-vehicle device each capable of suppressing deterioration of the detection accuracy of an observation target even when electromagnetic noise is input to a conversion unit for converting the beat signal into digital data.

Solution to Problem

A radar device according to the present disclosure includes: processing circuitry performing a process of: generating a beat signal when a frequency-modulated signal, whose frequency changes with passage of time, is intermittently and repeatedly transmitted as a radar signal and the radar signal reflected by an observation target is received as a reflection wave in a period when the radar signal is transmitted, the beat signal having a frequency that is a difference between a frequency of the radar signal that has been transmitted and a frequency of the reflection wave; converting the beat signal generated into digital data and outputting the digital data; detecting electromagnetic noise input using digital data in a period when no radar signal is transmitted, among the digital data output; and detecting the observation target using digital data in the period when the radar signal has been transmitted, among the digital data output, and the electromagnetic noise detected; intermittently and repeatedly outputting a frequency-modulated signal whose frequency changes with passage of time as a radar signal; and transmitting the radar signal output toward the observation target, receiving the radar signal reflected by the observation target as a reflection wave, and outputting each of the radar signal output and the reflection wave, wherein the process calculates each of a frequency of the electromagnetic noise input and a Doppler frequency that corresponds to a relative velocity with respect to a source of the electromagnetic noise using the digital data in the period when no radar signal is output, among the digital data output, and calculating each of a beat frequency that corresponds to a distance to the observation target and a Doppler frequency that corresponds to a relative velocity with respect to the observation target using the digital data in the period when the radar signal is output among the digital data output; and calculating each of the distance to the observation target and the relative velocity with respect to the observation target using the beat frequency calculated, the Doppler frequency calculated, the frequency of the electromagnetic noise calculated, and the Doppler frequency calculated.

Advantageous Effects of Invention

According to the present disclosure, a radar device includes: an electromagnetic noise detecting unit for detecting electromagnetic noise input to a conversion unit using digital data in a period when no radar signal is transmitted, among digital data output from the conversion unit; and an observation target detecting unit for detecting an observation target using digital data in a period when a radar signal has been transmitted, among the digital data output from the conversion unit, and the electromagnetic noise detected by the electromagnetic noise detecting unit. Therefore, a radar device according to the present disclosure can suppress deterioration of the detection accuracy of an observation target even when electromagnetic noise is input to the conversion unit.

BRIEF DESCRIPTION OF DRAWINGS

FIG. 3 is a hardware configuration diagram of a computer in a case where the signal processing unit 12 is implemented by software, firmware, or the like.

DESCRIPTION OF EMBODIMENTS

To describe the present invention further in detail, embodiments for carrying out the invention will be described below along with the accompanying drawings.

First Embodiment

Figure 1:
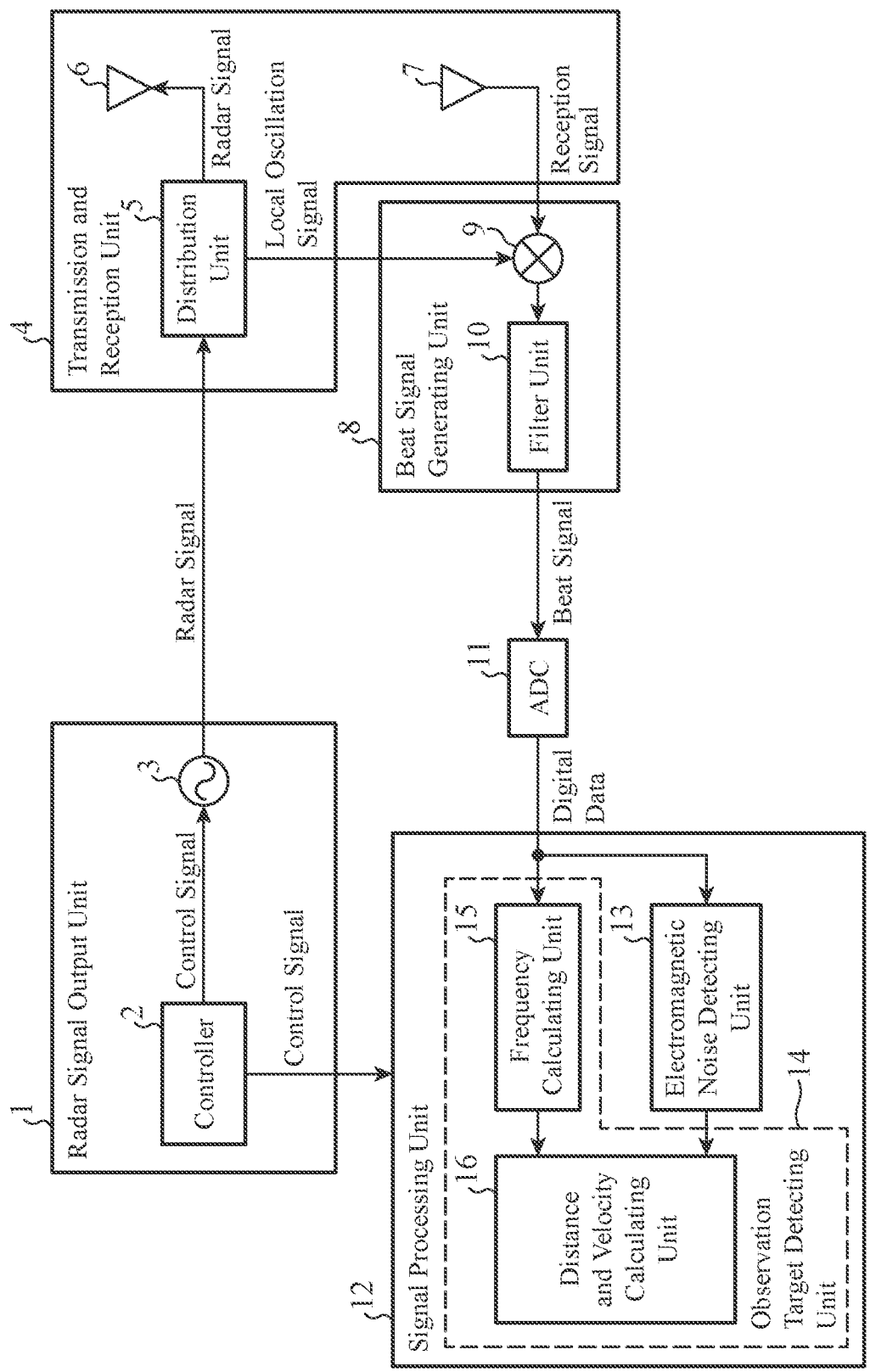
FIG. 1 is a configuration diagram illustrating a radar device according to a first embodiment.

FIG. 1 is a configuration diagram illustrating a radar device according to a first embodiment.

Figure 2:
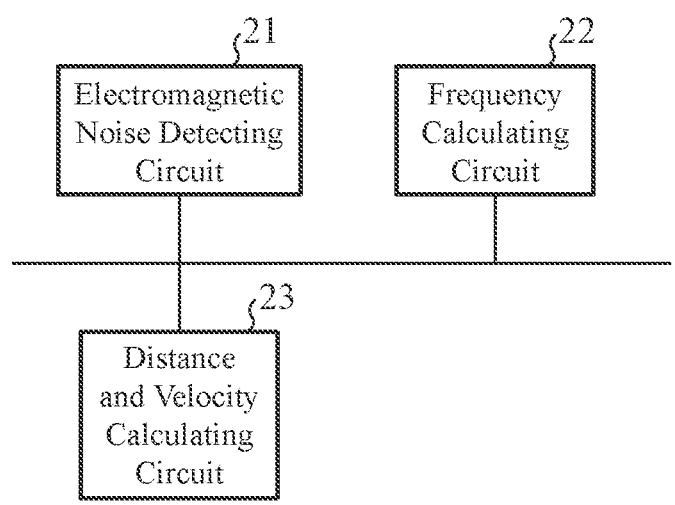
FIG. 2 is a hardware configuration diagram illustrating the hardware of a signal processing unit 12 in the radar device according to the first embodiment.

FIG. 2 is a hardware configuration diagram illustrating the hardware of a signal processing unit 12 in the radar device according to the first embodiment.

In a case where the radar device illustrated in FIG. 1 is mounted on a vehicle such as an automobile, observation targets correspond to, for example, other automobiles, pedestrians, or guardrails.

In FIG. 1, a radar signal output unit 1 includes a controller 2 and a signal source 3.

The radar signal output unit 1 intermittently and repeatedly outputs, to a transmission and reception unit 4, as a radar signal, a frequency-modulated signal whose frequency changes with the passage of time.

The controller 2 outputs a control signal indicating the output timing of the radar signal to each of the signal source 3 and the signal processing unit 12.

The signal source 3 intermittently and repeatedly outputs the frequency-modulated signal as a radar signal to a distribution unit 5 in accordance with the output timing indicated by the control signal output from the controller 2.

The transmission and reception unit 4 includes the distribution unit 5, a transmission antenna 6, and a reception antenna 7.

The transmission and reception unit 4 transmits the radar signal output from the radar signal output unit 1 toward an observation target and receives the radar signal reflected by the observation target as a reflection wave.

The transmission and reception unit 4 outputs each of the radar signal output from the radar signal output unit 1 and the reflection wave to the beat signal generating unit 8.

The distribution unit 5 divides the radar signal output from the signal source 3 into two, outputs one of the divided radar signals to the transmission antenna 6, and outputs the other one of the divided radar signals to a frequency mixing unit 9 as a local oscillation signal.

The transmission antenna 6 emits the radar signal output from the distribution unit 5 into space.

After the radar signal is emitted into space from the transmission antenna 6, the reception antenna 7 receives the radar signal reflected by an observation target as a reflection wave, and outputs the reception signal of the reflection wave that has been received to the frequency mixing unit 9.

The beat signal generating unit 8 includes the frequency mixing unit 9 and a filter unit 10.

When the radar signal reflected by the observation target is received as a reflection wave by the reception antenna 7 during a period when the radar signal is transmitted from the transmission and reception unit 4, the beat signal generating unit 8 generates a beat signal having a frequency that is the difference between the frequency of the radar signal transmitted by the transmission antenna 6 and the frequency of the reflection wave.

The beat signal generating unit 8 outputs the beat signal that has been generated to a conversion unit (hereinafter, referred to as the "analog-to-digital converter (ADC)") 11.

The frequency mixing unit 9 generates the beat signal having a frequency that is the difference between the frequency of the local oscillation signal output by the distribution unit 5 and the frequency of the reflection wave by mixing the local oscillation signal and the reception signal output from the reception antenna 7 during the period when the local oscillation signal is output from the distribution unit 5.

The frequency mixing unit 9 outputs the beat signal that has been generated to the filter unit 10.

The filter unit 10 is implemented by, for example, a low pass filter (LPF) or a band pass filter (BPF).

The filter unit 10 suppresses unnecessary components such as spurious signals contained in the beat signal output from the frequency mixing unit 9 and outputs the beat signal after the suppression of unnecessary components to the ADC 11.

The ADC 11 converts the beat signal generated by the beat signal generating unit 8 into digital data and outputs the digital data to each of an electromagnetic noise detecting unit 13 and an observation target detecting unit 14.

The signal processing unit 12 includes the electromagnetic noise detecting unit 13 and the observation target detecting unit 14.

The electromagnetic noise detecting unit 13 is implemented by, for example, an electromagnetic noise detecting circuit 21 illustrated in FIG. 2.

By referring to the control signal output from the controller 2, the electromagnetic noise detecting unit 13 specifies a period when no radar signal is output from the radar signal output unit 1 as a period when no radar signal is transmitted from the transmission and reception unit 4.

The electromagnetic noise detecting unit 13 detects electromagnetic noise input to the ADC 11 using digital data in the period that has been specified among the digital data output from the ADC 11.

Specifically, the electromagnetic noise detecting unit 13 calculates each of the frequency of the electromagnetic noise input to the ADC 11 and a Doppler frequency that corresponds to the relative velocity with respect to the source of the electromagnetic noise using the digital data in the period that has been specified.

The electromagnetic noise detecting unit 13 outputs each of the electromagnetic noise frequency and the Doppler frequency to a distance and velocity calculating unit 16.

The observation target detecting unit 14 includes a frequency calculating unit 15 and the distance and velocity calculating unit 16.

By referring to the control signal output from the controller 2, the observation target detecting unit 14 specifies a period when the radar signal has been output from the radar signal output unit 1 as a period when the radar signal is transmitted from the transmission and reception unit 4.

The observation target detecting unit 14 detects the observation target using the digital data in the period that has been specified among the digital data output from the ADC 11 and the electromagnetic noise detected by the electromagnetic noise detecting unit 13.

The frequency calculating unit 15 is implemented by, for example, a frequency calculating circuit 22 illustrated in FIG. 2.

The frequency calculating unit 15 specifies the period when the radar signal is output from the radar signal output unit 1 by referring to the control signal output from the controller 2.

The frequency calculating unit 15 calculates each of the beat frequency that corresponds to the distance to the observation target and the Doppler frequency that corresponds to the relative velocity with respect to the observation target using the digital data in the period that has been specified among the digital data output from the ADC 11.

The frequency calculating unit 15 outputs each of the beat frequency that corresponds to the distance to the observation target and the Doppler frequency that corresponds to the relative velocity with respect to the observation target to the distance and velocity calculating unit 16.

The distance and velocity calculating unit 16 is implemented by, for example, a distance and velocity calculating circuit 23 illustrated in FIG. 2.

The distance and velocity calculating unit 16 calculates each of the distance to the observation target and the relative velocity with respect to the observation target using the electromagnetic noise frequency calculated by the electromagnetic noise detecting unit 13, the Doppler frequency calculated by the electromagnetic noise detecting unit 13, the beat frequency calculated by the frequency calculating unit 15, and the Doppler frequency calculated by the frequency calculating unit 15.

In FIG. 1, it is assumed that the electromagnetic noise detecting unit 13, the frequency calculating unit 15, and the distance and velocity calculating unit 16, which are components of the signal processing unit 12, are each implemented by dedicated hardware as illustrated in FIG. 2. That is, it is assumed that the signal processing unit 12 is implemented by the electromagnetic noise detecting circuit 21, the frequency calculating circuit 22, and the distance and velocity calculating circuit 23.

Here, each of the electromagnetic noise detecting circuit 21, the frequency calculating circuit 22, and the distance and velocity calculating circuit 23 corresponds to, for example, a single circuit, a composite circuit, a programmed processor, a parallel programmed processor, an application specific integrated circuit (ASIC), a field-programmable gate array (FPGA), or a combination thereof.

The components of the signal processing unit 12 are not limited to those implemented by dedicated hardware, and the signal processing unit 12 may be implemented by software, firmware, or a combination of software and firmware.

The software or the firmware is stored in a memory of a computer as a program. The computer refers to hardware for executing the program and corresponds to, for example, a central processing unit (CPU), a central processing device, a processing device, an arithmetic device, a microprocessor, a microcomputer, a processor, or a digital signal processor (DSP).

Figure 3:
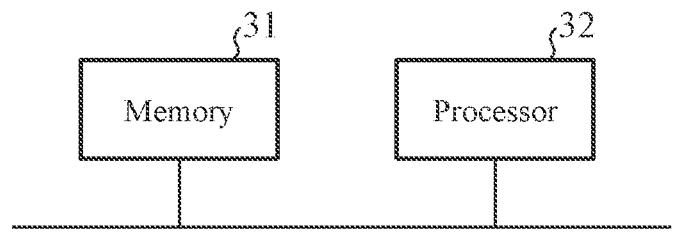

FIG. 3 is a hardware configuration diagram of a computer in a case where the signal processing unit 12 is implemented by software, firmware, or the like.

In a case where the signal processing unit 12 is implemented by software, firmware, or the like, a program for causing the computer to execute the processing procedures performed in the electromagnetic noise detecting unit 13, the frequency calculating unit 15, and the distance and velocity calculating unit 16 is stored in a memory 31. Then, a processor 32 of the computer executes the program stored in the memory 31.

Figure 4:
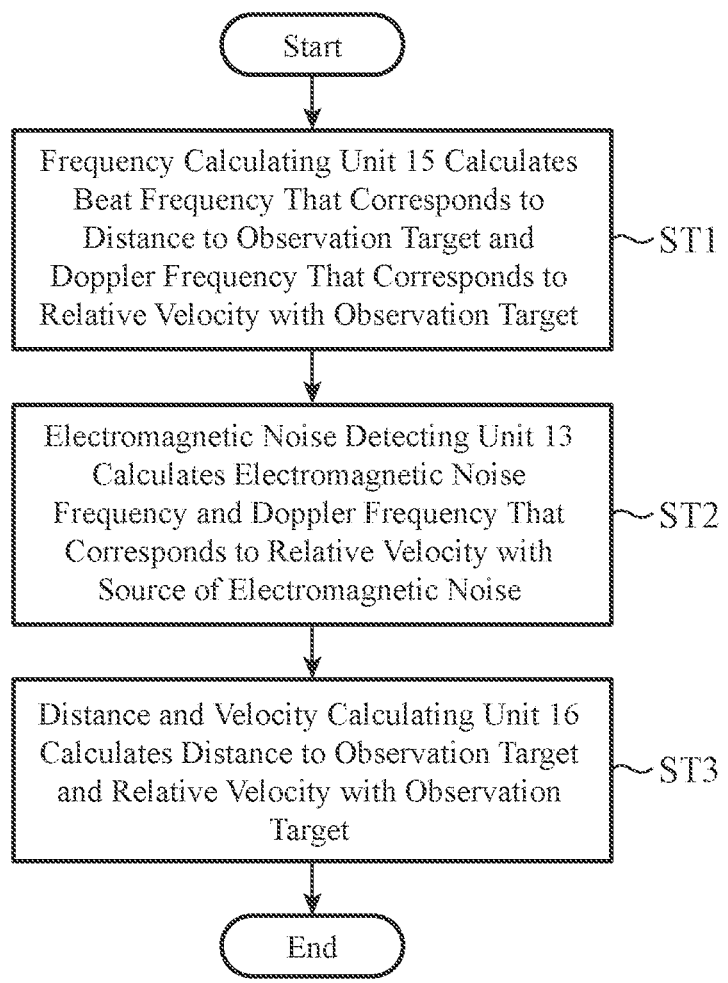
FIG. 4 is a flowchart illustrating an observation target detecting method, which is a processing procedure performed in the signal processing unit 12.

FIG. 4 is a flowchart illustrating an observation target detecting method, which is a processing procedure performed in the signal processing unit 12.

Meanwhile, in FIG. 2, an example in which each of the components of the signal processing unit 12 is implemented by dedicated hardware is illustrated, and in FIG. 3, an example in which the signal processing unit 12 is implemented by software, firmware, or the like is illustrated. However, this is merely an example, and some components in the signal processing unit 12 may be implemented by dedicated hardware, and the remaining components may be implemented by software, firmware, or the like.

Figure 5:
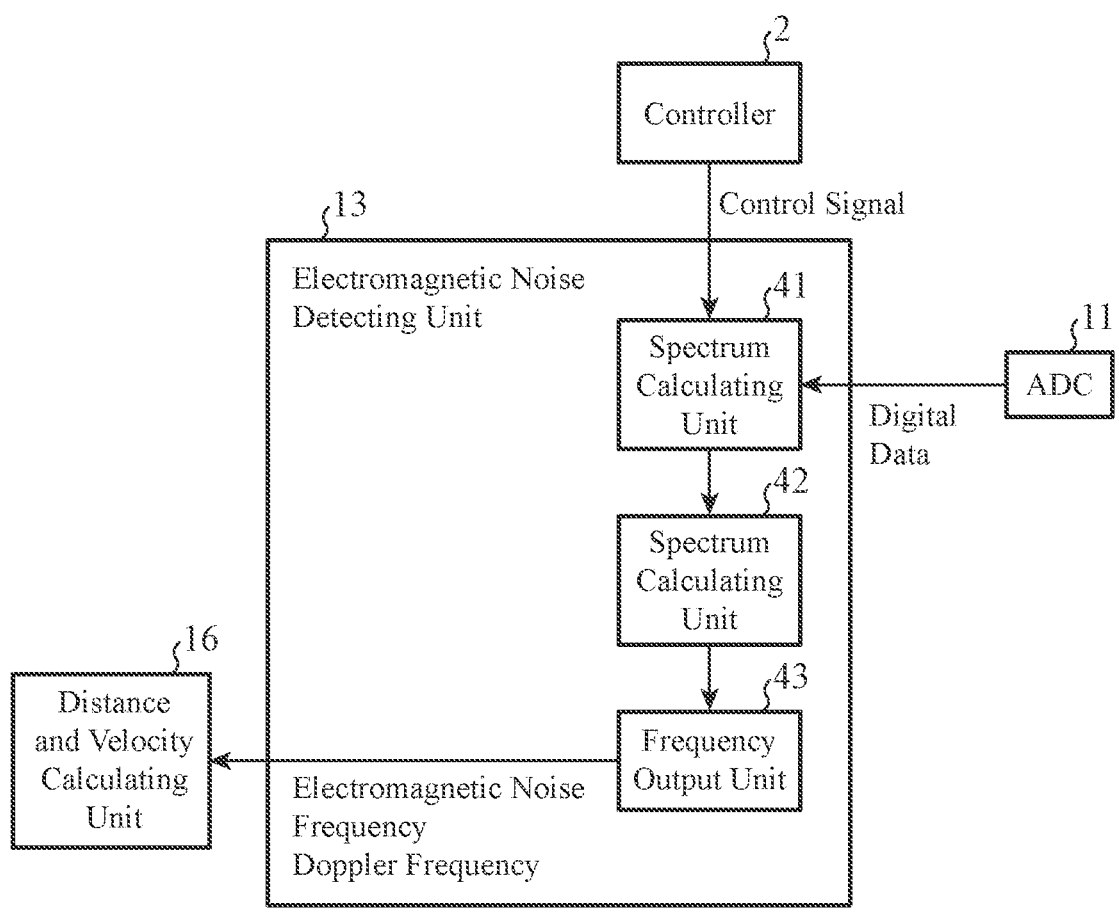
FIG. 5 is a configuration diagram illustrating an electromagnetic noise detecting unit 13 of the signal processing unit 12.

FIG. 5 is a configuration diagram illustrating the electromagnetic noise detecting unit 13 of the signal processing unit 12.

In FIG. 5, the spectrum calculating unit 41 specifies a period when no radar signal is output from the radar signal output unit 1 by referring to a control signal output from the controller 2.

The spectrum calculating unit 41 calculates a first frequency spectrum related to electromagnetic noise by performing a Fourier transform, in the distance direction, on digital data in the period that has been specified among digital data output from the ADC 11.

Since digital data in the period that has been specified is repeatedly output from the ADC 11, the spectrum calculating unit 41 performs a Fourier transform, in the distance direction, on each of a plurality of pieces of digital data that are repeatedly output and thereby calculates a plurality of first frequency spectra related to the electromagnetic noise.

The spectrum calculating unit 41 outputs the plurality of first frequency spectra related to the electromagnetic noise that has been calculated to the spectrum calculating unit 42.

The spectrum calculating unit 42 acquires the plurality of first frequency spectra output from the spectrum calculating unit 41.

The spectrum calculating unit 42 calculates a second frequency spectrum related to the electromagnetic noise by performing a Fourier transform, in the relative velocity direction, on the plurality of first frequency spectra that have been acquired.

The spectrum calculating unit 42 outputs the second frequency spectrum related to the electromagnetic noise to the frequency output unit 43.

The frequency output unit 43 detects peak values of spectrum values in the second frequency spectrum output from the spectrum calculating unit 42.

The frequency output unit 43 outputs the beat frequency of the peak values that have been detected to the distance and velocity calculating unit 16 as the electromagnetic noise frequency.

The frequency output unit 43 outputs the Doppler frequency of the peak values that have been detected to the distance and velocity calculating unit 16 as a Doppler frequency that corresponds to the relative velocity with respect to the source of the electromagnetic noise.

Figure 6:
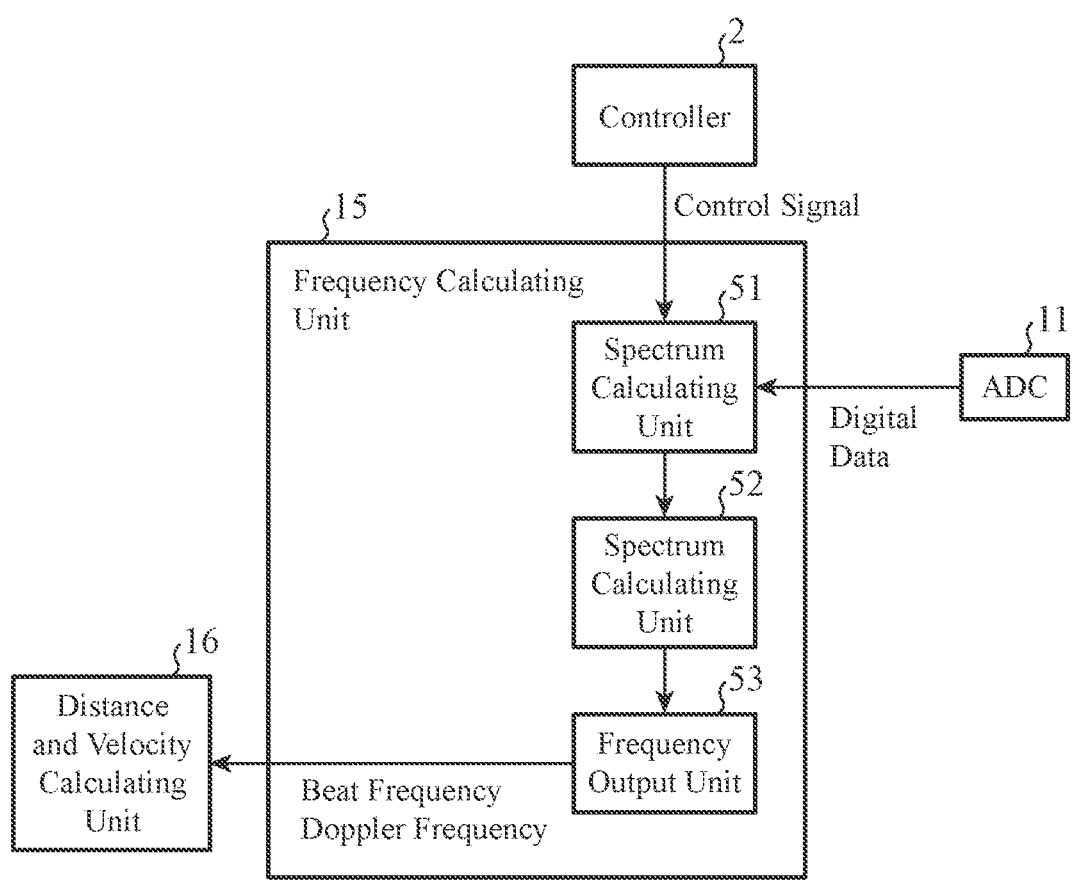
FIG. 6 is a configuration diagram illustrating a frequency calculating unit 15 of the signal processing unit 12.

FIG. 6 is a configuration diagram illustrating the frequency calculating unit 15 of the signal processing unit 12.

In FIG. 6, the spectrum calculating unit 51 specifies a period when a radar signal is output from the radar signal output unit 1 by referring to a control signal output from the controller 2.

The spectrum calculating unit 51 calculates a first frequency spectrum related to an observation target by performing a Fourier transform, in the distance direction, on digital data in the period that has been specified among digital data output from the ADC 11.

Since digital data in the period that has been specified is repeatedly output from the ADC 11, the spectrum calculating unit 51 performs a Fourier transform, in the distance direction, on each of a plurality of pieces of digital data that are repeatedly output and thereby calculates a plurality of first frequency spectra related to the observation target.

The spectrum calculating unit 51 outputs a plurality of first frequency spectra related to the observation target that has been calculated to the spectrum calculating unit 52.

The spectrum calculating unit 52 acquires the plurality of first frequency spectra output from the spectrum calculating unit 51.

The spectrum calculating unit 52 calculates a second frequency spectrum related to the observation target by performing a Fourier transform, in the relative velocity direction, on the plurality of first frequency spectra that have been acquired.

The spectrum calculating unit 52 outputs the second frequency spectrum related to the observation target to the frequency output unit 53.

The frequency output unit 53 detects peak values of spectrum values in the second frequency spectrum output from the spectrum calculating unit 52.

The frequency output unit 53 outputs the beat frequency of the peak values that have been detected to the distance and velocity calculating unit 16 as a beat frequency that corresponds to the distance to the observation target.

The frequency output unit 53 outputs the Doppler frequency of the peak values that have been detected to the distance and velocity calculating unit 16 as a Doppler frequency that corresponds to the relative velocity with respect to the observation target.

Next, the operation of the radar device illustrated in FIG. 1 will be described.

Figure 7:
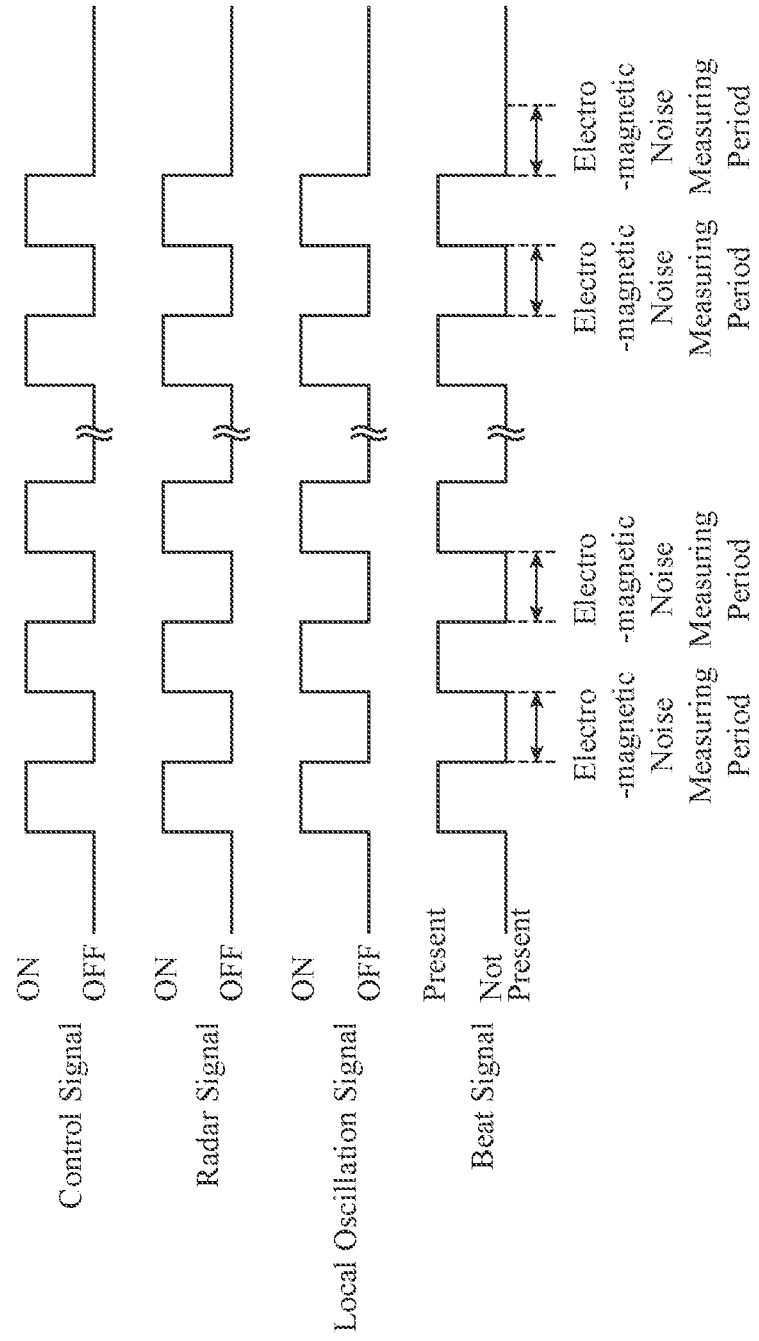
FIG. 7 is an explanatory diagram illustrating an example of measurement timing of an observation target in the radar device illustrated in FIG. 1.

FIG. 7 is an explanatory diagram illustrating an example of measurement timing of an observation target in the radar device illustrated in FIG. 1.

As illustrated in FIG. 7, the controller 2 outputs a control signal indicating output timing of a radar signal to each of the signal source 3 and the signal processing unit 12.

A period when the control signal is ON is a period when the radar signal is output, and a period when the control signal is OFF is a period when no radar signal is output.

In the radar device illustrated in FIG. 1, the period when the control signal is ON occurs K times. Likewise, the period when the control signal is turned OFF after being turned ON occurs K times.

As illustrated in FIG. 7, the signal source 3 outputs a frequency-modulated signal as a radar signal to the distribution unit 5 during a period when the control signal output from the controller 2 is ON.

As illustrated in FIG. 7, the signal source 3 outputs no radar signal to the distribution unit 5 during a period when the control signal output from the controller 2 is OFF.

The distribution unit 5 divides the radar signal output from the signal source 3 into two.

The distribution unit 5 outputs one of the divided radar signals to the transmission antenna 6 and outputs the other one of the divided radar signals to the frequency mixing unit 9 as a local oscillation signal.

When the transmission antenna 6 receives the radar signal from the distribution unit 5, the transmission antenna 6 emits the radar signal into space.

After the radar signal is emitted into space from the transmission antenna 6, the reception antenna 7 receives the radar signal reflected by an observation target as a reflection wave, and outputs the reception signal of the reflection wave that has been received to the frequency mixing unit 9.

The frequency mixing unit 9 generates a beat signal having a frequency that is the difference between the frequency of the radar signal output by the distribution unit 5 and the frequency of the reflection wave by mixing the local oscillation signal and the reception signal output from the reception antenna 7 when the local oscillation signal is output from the distribution unit 5.

The frequency mixing unit 9 outputs the beat signal that has been generated to the filter unit 10.

When no local oscillation signal is output from the distribution unit 5, the frequency mixing unit 9 does not generate a beat signal and outputs no beat signal to the filter unit 10.

When the filter unit 10 receives the beat signal from the frequency mixing unit 9, the filter unit 10 suppresses unnecessary components such as spurious signals contained in the beat signal and outputs the beat signal after the suppression of the unnecessary components to the ADC 11.

When the ADC 11 receives the beat signal from the filter unit 10, the ADC 11 converts the beat signal into digital data and outputs the digital data to each of the electromagnetic noise detecting unit 13 and the frequency calculating unit 15.

For example, there are cases where electromagnetic noise having frequencies less than or equal to the sampling frequency band of ADC 11 is input to ADC 11 and the electromagnetic noise is superimposed on the beat signal. As the electromagnetic noise, in addition to electromagnetic waves generated from any component of the radar device, electromagnetic waves arriving from the outside of the radar device are also conceivable.

When the ADC 11 receives no beat signal from the filter unit 10, the ADC 11 converts the electromagnetic noise input thereto into digital data and outputs the digital data to each of the electromagnetic noise detecting unit 13 and the frequency calculating unit 15.

The frequency calculating unit 15 specifies the period when the radar signal is output from the radar signal output unit 1 by referring to the control signal output from the controller 2. In FIG. 7, a period when the radar signal is ON is a period when the radar signal is output from the radar signal output unit 1.

The frequency calculating unit 15 calculates each of the beat frequency that corresponds to the distance to the observation target and the Doppler frequency that corresponds to the relative velocity with respect to the observation target using the digital data in the period that has been specified among the digital data output from the ADC 11 (step ST1 in FIG. 4).

The frequency calculating unit 15 outputs each of the beat frequency that corresponds to the distance to the observation target and the Doppler frequency that corresponds to the relative velocity with respect to the observation target to the distance and velocity calculating unit 16.

Hereinafter, the calculation process of a beat frequency and a Doppler frequency in the frequency calculating unit 15 will be described specifically.

Figure 8:
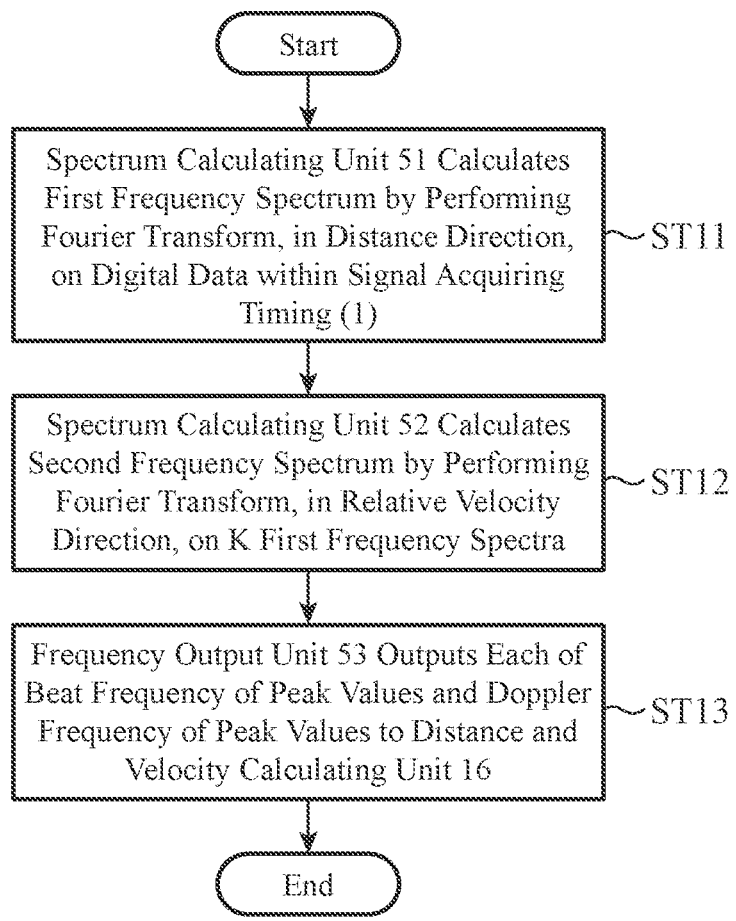
FIG. 8 is a flowchart illustrating a calculation process of a beat frequency and a Doppler frequency in the frequency calculating unit 15.

FIG. 8 is a flowchart illustrating the calculation process of a beat frequency and a Doppler frequency in the frequency calculating unit 15.

Figure 9:
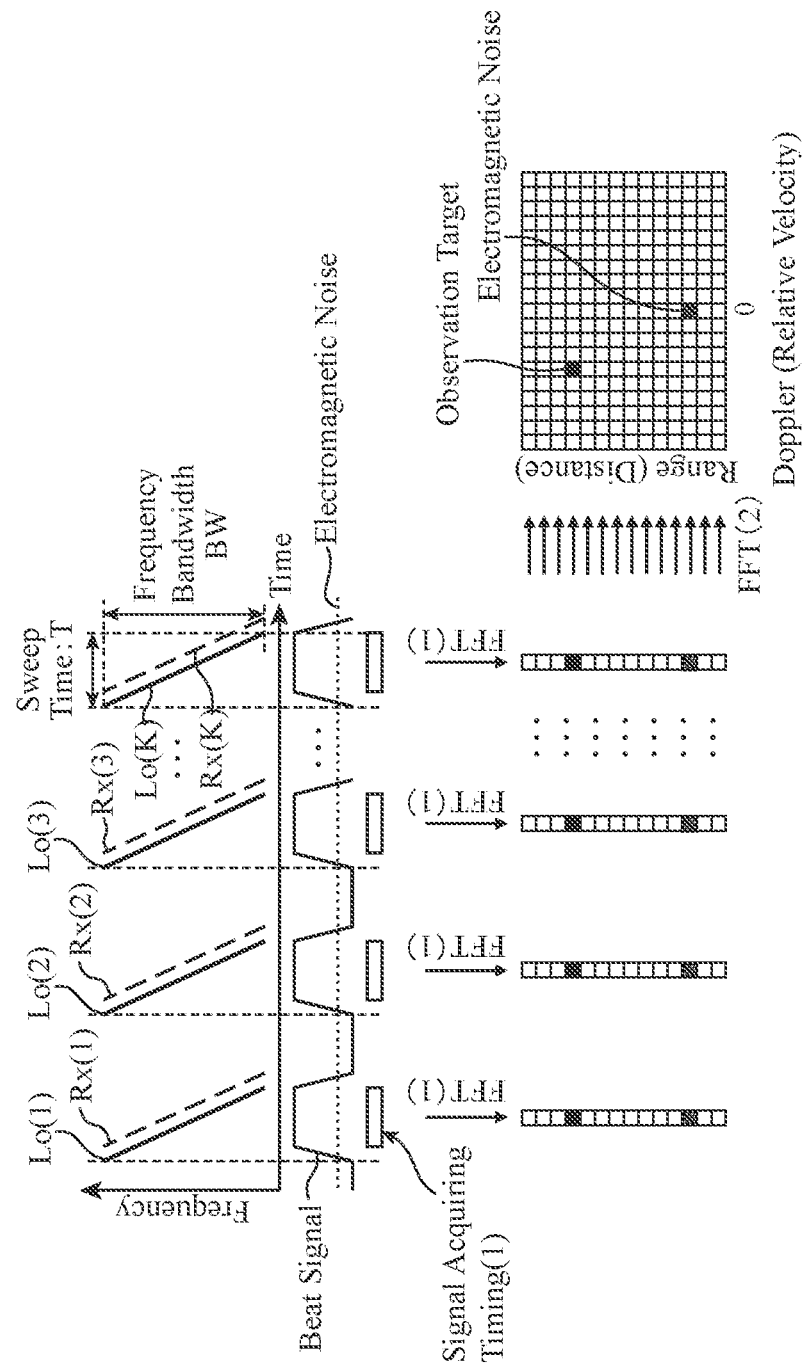
FIG. 9 is an explanatory diagram illustrating a calculation process of a beat frequency and a Doppler frequency in the frequency calculating unit 15.

FIG. 9 is an explanatory diagram illustrating the calculation process of a beat frequency and a Doppler frequency in the frequency calculating unit 15.

In FIG. 9, Lo (1), . . . , Lo (K) denote local oscillation signals output from the distribution unit 5 to the frequency mixing unit 9. Symbols Rx (1), . . . , Rx (K) denote reception signals output from the reception antenna 7 to the frequency mixing unit 9. Symbol K denotes an integer greater than or equal to 2.

In the example of FIG. 9, electromagnetic noise of a continuous wave having a constant frequency is input to the ADC 11.

Signal acquiring timing (1) indicates the timing at which the spectrum calculating unit 51 acquires the digital data output from the ADC 11. The signal acquiring timing (1) is included in the period when the radar signal is output from the radar signal output unit 1, and the length of the signal acquiring timing (1) is approximately the same as one cycle of the local oscillation signal.

Symbol T denotes the sweep time of local oscillation signal Lo (k) (k=1, . . . , K), which is time on the order of microseconds. Symbol BW denotes the frequency bandwidth of local oscillation signal Lo (k).

In FIG. 9, an example is illustrated in which there is a single observation target for the sake of simplicity. However, this is merely an example, and there may be two or more observation targets. In FIG. 9, an example is illustrated in which there is a single type of electromagnetic noise for the sake of simplicity. However, this is merely an example, and two or more types of electromagnetic noise may be input to the ADC 11.

The spectrum calculating unit 51 specifies the period when the radar signal is output from the radar signal output unit 1 by referring to the control signal output from the controller 2.

The spectrum calculating unit 51 acquires the digital data output from the ADC 11 at the signal acquiring timing (1) included in the period that has been specified.

The spectrum calculating unit 51 calculates the first frequency spectrum of the observation target by performing a Fourier transform, in the distance direction, on the digital data in the signal acquiring timing (1) (step ST11 in FIG. 8).

In FIG. 9, FFT (1) denotes a Fourier transform in the distance direction. By performing a Fourier transform on the digital data in the distance direction, spectrum values of reception signal Rx (k) (k=1, . . . , K) of the reflection wave are integrated to beat frequency $F_{sb\_r}$ expressed by Equation 1 below.

$$F_{sb\_r} = \frac{2BW \cdot R}{c \cdot T} \quad (1)$$

In Equation 1, R denotes the distance from the radar device illustrated in FIG. 1 to the observation target, and c denotes the speed of light.

The spectrum value of the electromagnetic noise is integrated to electromagnetic noise frequency $F_{n\_r}$ when the spectrum calculating unit 51 performs a Fourier transform on the digital data in the distance direction.

In the example of FIG. 9, since the ON period of the control signal output from the controller 2 occurs K times, the spectrum calculating unit 51 performs a Fourier transform on each of the K pieces of digital data that are different from each other in the distance direction and thereby calculates K first frequency spectra.

The spectrum calculating unit 51 outputs the K first frequency spectra that have been calculated to the spectrum calculating unit 52.

The spectrum calculating unit 52 acquires the K first frequency spectra output from the spectrum calculating unit 51.

The spectrum calculating unit 52 calculates the second frequency spectrum related to the observation target by performing a Fourier transform, in the relative velocity direction, on the K first frequency spectra that have been acquired (step ST12 in FIG. 8).

In FIG. 9, FFT (2) denotes a Fourier transform in the relative velocity direction. When the spectrum calculating unit 52 performs Fourier transform on the K first frequency spectra in the relative velocity direction, the spectrum values of reception signal Rx (k) of the reflection wave is integrated to Doppler frequency $F_{sb\_v}$ expressed in Equation 2 below.

$$F_{sb\_v} = \frac{2f \cdot v}{c} \quad (2)$$

In Equation 2, f denotes the center frequency of local oscillation signal Lo (k), and v denotes the relative velocity between the radar device illustrated in FIG. 1 and the observation target.

Likewise, the spectrum values of the electromagnetic noise is integrated to Doppler frequency $F_{n\_v}$ that corresponds to the relative velocity between the radar device illustrated in FIG. 1 and the source of the electromagnetic noise. In the example of FIG. 9, since the relative velocity with respect to the source of the electromagnetic noise is 0, the spectrum values of the electromagnetic noise are integrated to Doppler frequency $F_{n\_v}$ that corresponds to the relative velocity of 0. However, this is merely an example, and spectrum values of electromagnetic noise may be integrated to a Doppler frequency that corresponds to a relative velocity other than 0 with respect to the source of the electromagnetic noise. Furthermore, in the example of FIG. 9, since the electromagnetic noise of a continuous wave is input to the ADC 11 and the electromagnetic noise frequency does not change, the spectrum values of the electromagnetic noise are integrated to electromagnetic noise frequency $F_{n\_r}$.

The spectrum calculating unit 52 outputs the second frequency spectrum related to the observation target to the frequency output unit 53.

When the frequency output unit 53 receives the second frequency spectrum from the spectrum calculating unit 52, the frequency output unit 53 detects peak values of spectrum values in the second frequency spectrum.

Since the process itself for detecting peak values of spectrum values is known technology, detailed description thereof will be omitted.

The frequency output unit 53 outputs the beat frequency of the peak values that have been detected to the distance and velocity calculating unit 16 as beat frequency $F_{sb\_r}$ that corresponds to the distance to the observation target (step ST13 in FIG. 8).

The frequency output unit 53 outputs the Doppler frequency of the peak values that have been detected to the distance and velocity calculating unit 16 as Doppler frequency $F_{sb\_v}$ that corresponds to the relative velocity with respect to the observation target (step ST13 in FIG. 8).

Since the frequency output unit 53 also detects the spectrum values of the electromagnetic noise as peak values, the frequency output unit 53 also outputs electromagnetic noise frequency $F_{n\_r}$ to the distance and velocity calculating unit 16 as beat frequency $F_{sb\_r}$ that corresponds to the distance to the observation target. The frequency output unit 53 also outputs Doppler frequency $F_{sb\_v}$ that corresponds to the relative velocity with respect to the source of the electromagnetic noise to the distance and velocity calculating unit 16 as Doppler frequency $F_{sb\_v}$ that corresponds to the relative velocity with respect to the observation target.

By referring to the control signal output from the controller 2, the electromagnetic noise detecting unit 13 specifies a period when no radar signal is output from the radar signal output unit 1 as a period when no radar signal is transmitted from the transmission and reception unit 4. In FIG. 7, a period when the radar signal is OFF is a period when no radar signal is output from the radar signal output unit 1.

The electromagnetic noise detecting unit 13 calculates each of frequency $F_{n\_r}$ of the electromagnetic noise input to the ADC 11 and Doppler frequency $F_{n\_v}$ that corresponds to the relative velocity with respect to the source of the electromagnetic noise using the digital data in the period that has been specified among the digital data output from the ADC 11 (step ST2 in FIG. 4).

The electromagnetic noise detecting unit 13 outputs each of electromagnetic noise frequency $F_{n\_r}$ and Doppler frequency $F_{n\_v}$ that have been calculated to the distance and velocity calculating unit 16.

Hereinafter, the calculation process of electromagnetic noise frequency $F_{n\_r}$ and Doppler frequency $F_{n\_v}$ in the electromagnetic noise detecting unit 13 will be described specifically.

Figure 10:
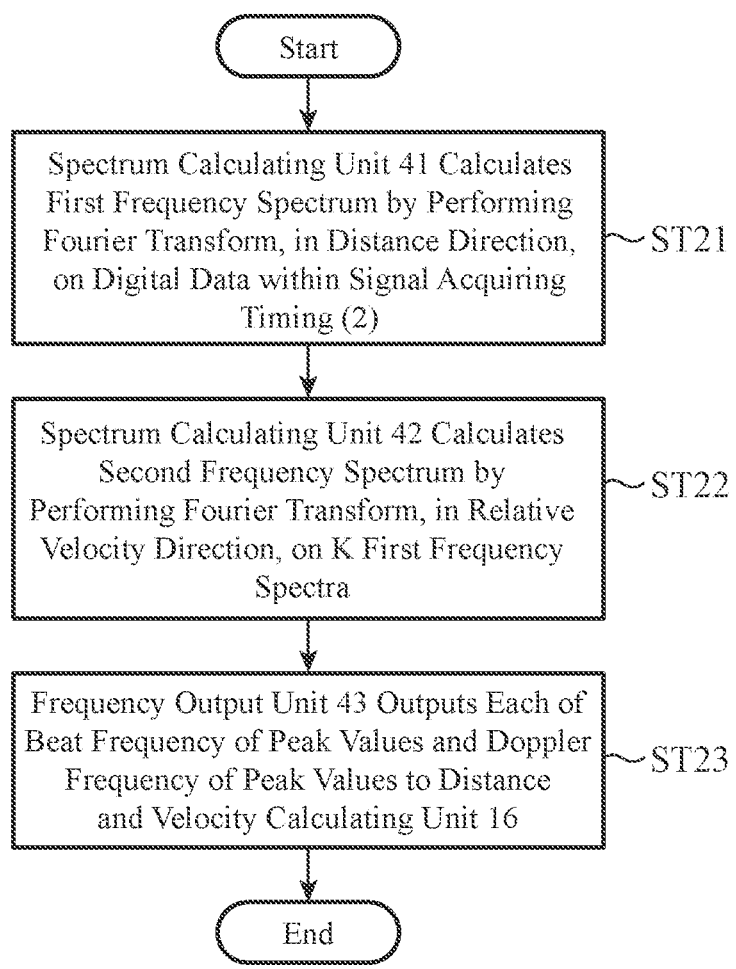
FIG. 10 is a flowchart illustrating a calculation process of an electromagnetic noise frequency and a Doppler frequency in an electromagnetic noise detecting unit 13.

FIG. 10 is a flowchart illustrating the calculation process of electromagnetic noise frequency $F_{n\_r}$ and Doppler frequency $F_{n\_v}$ in the electromagnetic noise detecting unit 13.

Figure 11:
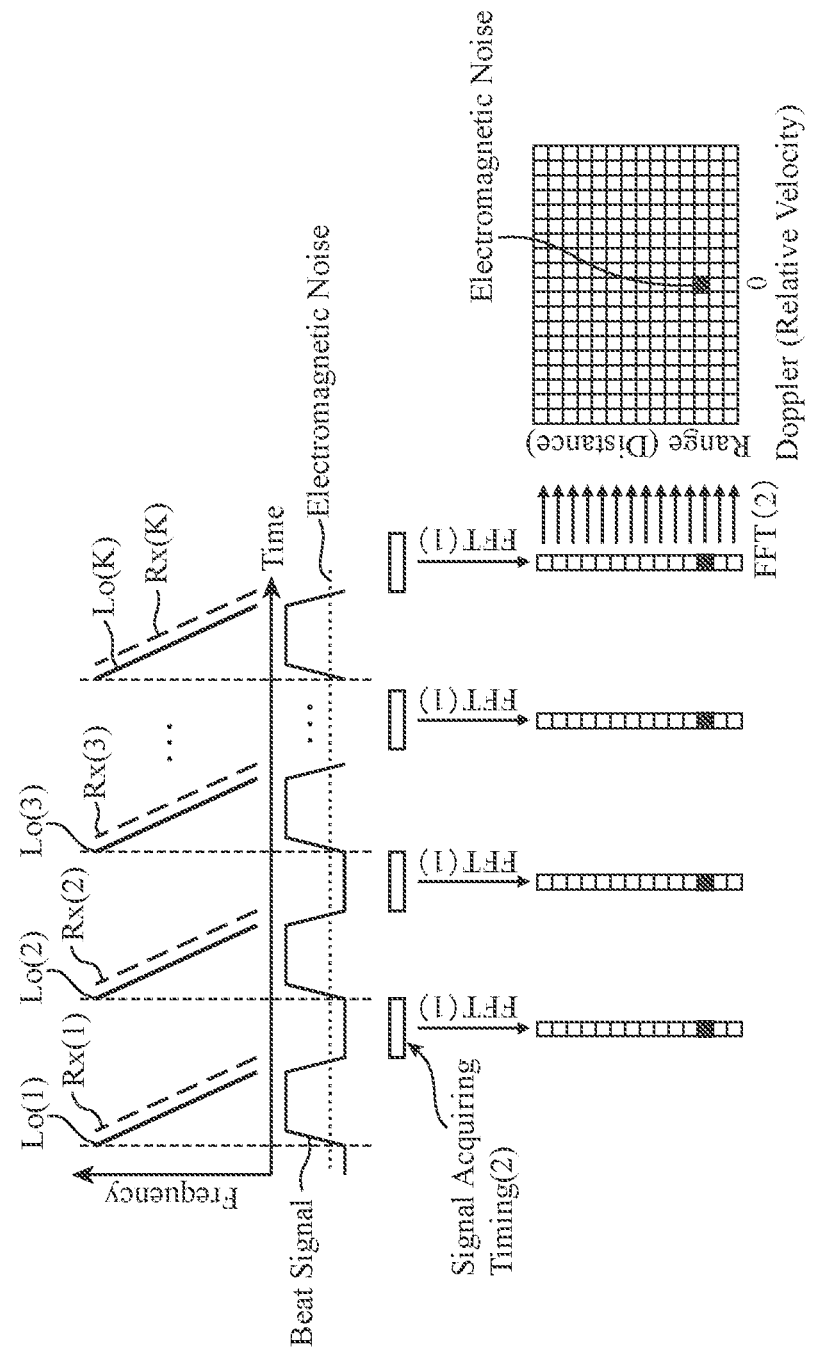
FIG. 11 is an explanatory diagram illustrating a calculation process of an electromagnetic noise frequency and a Doppler frequency in the electromagnetic noise detecting unit 13.

FIG. 11 is an explanatory diagram illustrating the calculation process of electromagnetic noise frequency $F_{n\_r}$ and Doppler frequency $F_{n\_v}$ in the electromagnetic noise detecting unit 13.

In FIG. 11, Lo (1), Lo ..., (K) denote local oscillation signals output from the distribution unit 5 to the frequency mixing unit 9. Symbols Rx (1), ..., Rx (K) denote reception signals output from the reception antenna 7 to the frequency mixing unit 9.

In the example of FIG. 11, electromagnetic noise of a continuous wave having a constant frequency is input to the ADC 11.

Signal acquiring timing (2) indicates the timing at which the spectrum calculating unit 41 acquires the digital data output from the ADC 11. The signal acquiring timing (2) is included in the period when no radar signal is output from the radar signal output unit 1, and the length of signal acquiring timing (2) is approximately the same as one cycle of the local oscillation signal.

In the example of FIG. 11, the length of the signal acquiring timing (2) is approximately the same as one cycle of the local oscillation signal. However, this is merely an example, and the length of the signal acquiring timing (2) may be different from one cycle of the local oscillation signal. In a case where a period when no radar signal is output from the radar signal output unit 1 is shorter than a period when the radar signal is output from the radar signal output unit 1, although the resolution of electromagnetic noise that can be detected is deteriorated, it is possible to detect whether or not there is electromagnetic noise.

The spectrum calculating unit 41 specifies the period when no radar signal is output from the radar signal output unit 1 by referring to the control signal output from the controller 2.

The spectrum calculating unit 41 acquires the digital data output from the ADC 11 at the signal acquiring timing (2) included in the period that has been specified.

The spectrum calculating unit 41 calculates the first frequency spectrum related to the electromagnetic noise by performing a Fourier transform, in the distance direction, on the digital data in the signal acquiring timing (2) (step ST21 in FIG. 10).

In FIG. 11, FFT (1) denotes a Fourier transform in the distance direction.

During the signal acquiring timing (2), no beat signal is generated by the frequency mixing unit 9. Therefore, even when the digital data is Fourier-transformed in the distance direction by the spectrum calculating unit 41, the spectrum values of reception signal Rx (k) of the reflection wave are not integrated to beat frequency $F_{sb\_r}$ expressed in Equation 1.

When the digital data is Fourier-transformed in the distance direction by the spectrum calculating unit 41, the spectrum values of the electromagnetic noise are integrated to Doppler frequency $F_{n\_v}$ that corresponds to the relative velocity between the radar device illustrated in FIG. 1 and the source of the electromagnetic noise.

In the example of FIG. 11, since the OFF period of the control signal output from the controller 2 occurs K times, the spectrum calculating unit 41 performs a Fourier transform on each of the K pieces of digital data that are different from each other in the distance direction and thereby calculates K first frequency spectra.

The spectrum calculating unit 41 outputs the K first frequency spectra that have been calculated to the spectrum calculating unit 42.

The spectrum calculating unit 42 acquires the K first frequency spectra output from the spectrum calculating unit 41.

The spectrum calculating unit 42 calculates the second frequency spectrum related to the electromagnetic noise by performing a Fourier transform, in the relative velocity direction, on the K first frequency spectra that have been acquired (step ST22 in FIG. 10).

In FIG. 11, FFT (2) denotes a Fourier transform in the relative velocity direction. When the K first frequency spectra are Fourier-transformed in the relative velocity direction by the spectrum calculating unit 42, the spectrum values of the electromagnetic noise are integrated to Doppler frequency $F_{n\_v}$ that corresponds to the relative velocity with respect to the source of the electromagnetic noise.

In the example of FIG. 11, since the relative velocity with respect to the source of the electromagnetic noise is 0, the spectrum values of the electromagnetic noise are integrated to Doppler frequency $F_{n\_v}$ that corresponds to the relative velocity of 0. However, this is merely an example, and spectrum values of electromagnetic noise may be integrated to a Doppler frequency that corresponds to a relative velocity other than 0 with respect to the source of the electromagnetic noise. Furthermore, in the example of FIG. 11, since the electromagnetic noise of a continuous wave is input to the ADC 11 and the electromagnetic noise frequency does not change, the spectrum values of the electromagnetic noise are integrated to electromagnetic noise frequency $F_{n\_r}$.

When the frequency output unit 43 receives the second frequency spectrum from the spectrum calculating unit 42, the frequency output unit 43 detects peak values of spectrum values in the second frequency spectrum.

Since the process itself for detecting peak values of spectrum values is known technology, detailed description thereof will be omitted.

The frequency output unit 43 outputs the beat frequency of the peak values that have been detected to the distance and velocity calculating unit 16 as electromagnetic noise frequency $F_{n\_r}$ (step ST23 in FIG. 10).

The frequency output unit 43 outputs the Doppler frequency of the peak values that have been detected to the distance and velocity calculating unit 16 as Doppler frequency $F_{n\_v}$ that corresponds to the relative velocity with respect to the source of the electromagnetic noise (step ST23 in FIG. 10).

The distance and velocity calculating unit 16 acquires a set of beat frequency $F_{sb\_r}$ and Doppler frequency $F_{sb\_v}$ output from the frequency calculating unit 15.

In the example of FIG. 9, since there are two peaks that correspond to one observation target and one type of electromagnetic noise, the distance and velocity calculating unit 16 acquires two sets of beat frequency $F_{sb\_r}$ and Doppler frequency $F_{sb\_v}$ from the frequency calculating unit 15.

The distance and velocity calculating unit 16 acquires a set of electromagnetic noise frequency $F_{n\_r}$ and Doppler frequency $F_{n\_v}$ output from the electromagnetic noise detecting unit 13.

In the example of FIG. 11, since there is one peak that corresponds to one type of electromagnetic noise, the distance and velocity calculating unit 16 acquires one set of electromagnetic noise frequency $F_{n\_r}$ and Doppler frequency $F_{n\_v}$ from the electromagnetic noise detecting unit 13.

The distance and velocity calculating unit 16 compares the two sets of beat frequency $F_{sb\_r}$ and Doppler frequency $F_{sb\_v}$ acquired from the frequency calculating unit 15 and one set of electromagnetic noise frequency $F_{n\_r}$ and Doppler frequency $F_{n\_v}$ acquired from the electromagnetic noise detecting unit 13.

Of the two sets of beat frequency $F_{sb\_r}$ and Doppler frequency $F_{sb\_v}$, one of the sets matches the one set of electromagnetic noise frequency $F_{n\_r}$ and Doppler frequency $F_{n\_v}$ acquired from the electromagnetic noise detecting unit 13.

Specifically, of two beat frequencies $F_{sb\_r}$, one beat frequency $F_{sb\_r}$ coincides with electromagnetic noise frequency $F_{n\_r}$. Furthermore, Doppler frequency $F_{sb\_v}$, which corresponds to beat frequency $F_{sb\_r}$ which matches electromagnetic noise frequency $F_{n\_r}$, matches Doppler frequency $F_{n\_v}$.

Figure 12:
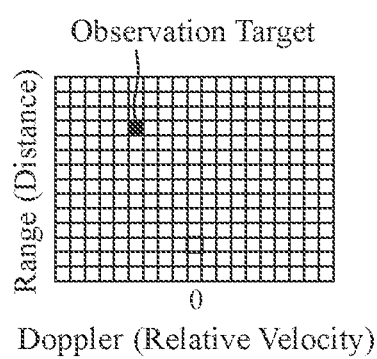
FIG. 12 is an explanatory diagram illustrating beat frequency $F_{sb\_r}$ that corresponds to the distance to an observation target and Doppler frequency $F_{sb\_v}$ that corresponds to the relative velocity with respect to the observation target.

As illustrated in FIG. 12, of the two sets of beat frequency $F_{sb\_r}$ and Doppler frequency $F_{sb\_v}$, the distance and velocity calculating unit 16 discards the set that matches the set of electromagnetic noise frequency $F_{n\_r}$ and Doppler frequency $F_{n\_v}$.

FIG. 12 is an explanatory diagram illustrating beat frequency $F_{sb\_r}$ corresponding to the distance to the observation target and Doppler frequency $F_{sb\_v}$ corresponding to the relative velocity with respect to the observation target.

The distance and velocity calculating unit 16 calculates the distance to the observation target from beat frequency $F_{sb\_r}$ included in the set that remains without being discarded (step ST3 in FIG. 4).

The distance and velocity calculating unit 16 calculates the relative velocity with respect to the observation target from Doppler frequency $F_{sb\_v}$ included in the set that remains without being discarded (step ST3 in FIG. 4).

Since the process itself of calculating the distance to the observation target from beat frequency $F_{sb\_r}$ is known technology, detailed description thereof will be omitted. Likewise, since the process itself of calculating the relative velocity with respect to the observation target from Doppler frequency $F_{sb\_v}$ is known technology, detailed description thereof will be omitted.

In the above first embodiment, the radar device includes: the electromagnetic noise detecting unit 13 for detecting the electromagnetic noise input to the ADC 11 using digital data in a period when no radar signal is transmitted, among the digital data output from the ADC 11; and the observation target detecting unit 14 for detecting an observation target using digital data in the period when the radar signal has been transmitted, among the digital data output from the ADC 11, and the electromagnetic noise detected by the electromagnetic noise detecting unit 13. Therefore, the radar device can suppress deterioration of the detection accuracy of the observation target even when electromagnetic noise is input to the ADC 11.

In the radar device illustrated in FIG. 1, the frequency output unit 53 of the frequency calculating unit 15 outputs, to the distance and velocity calculating unit 16, the beat frequency of the peak values of the spectrum values in the second frequency spectrum output from the spectrum calculating unit 52 and the Doppler frequency of the peak values. However, this is merely an example, and the frequency output unit 53 may output the second frequency spectrum output from the spectrum calculating unit 52 to the distance and velocity calculating unit 16.

Furthermore, in the radar device illustrated in FIG. 1, the frequency output unit 43 of the electromagnetic noise detecting unit 13 outputs, to the distance and velocity calculating unit 16, the beat frequency of the peak values of the spectrum values in the second frequency spectrum output from the spectrum calculating unit 42 and the Doppler frequency of the peak values. However, this is merely an example, and the frequency output unit 43 may output the second frequency spectrum output from the spectrum calculating unit 42 to the distance and velocity calculating unit 16.

Second Embodiment

In the radar device illustrated in FIG. 1, the radar signal output unit 1 intermittently and repeatedly outputs the radar signal to the transmission and reception unit 4.

In a second embodiment, a radar device including a switch 62 for repeatedly switching between connection and disconnection between a radar signal output unit 1 and a transmission and reception unit 4 will be described.

Figure 13:
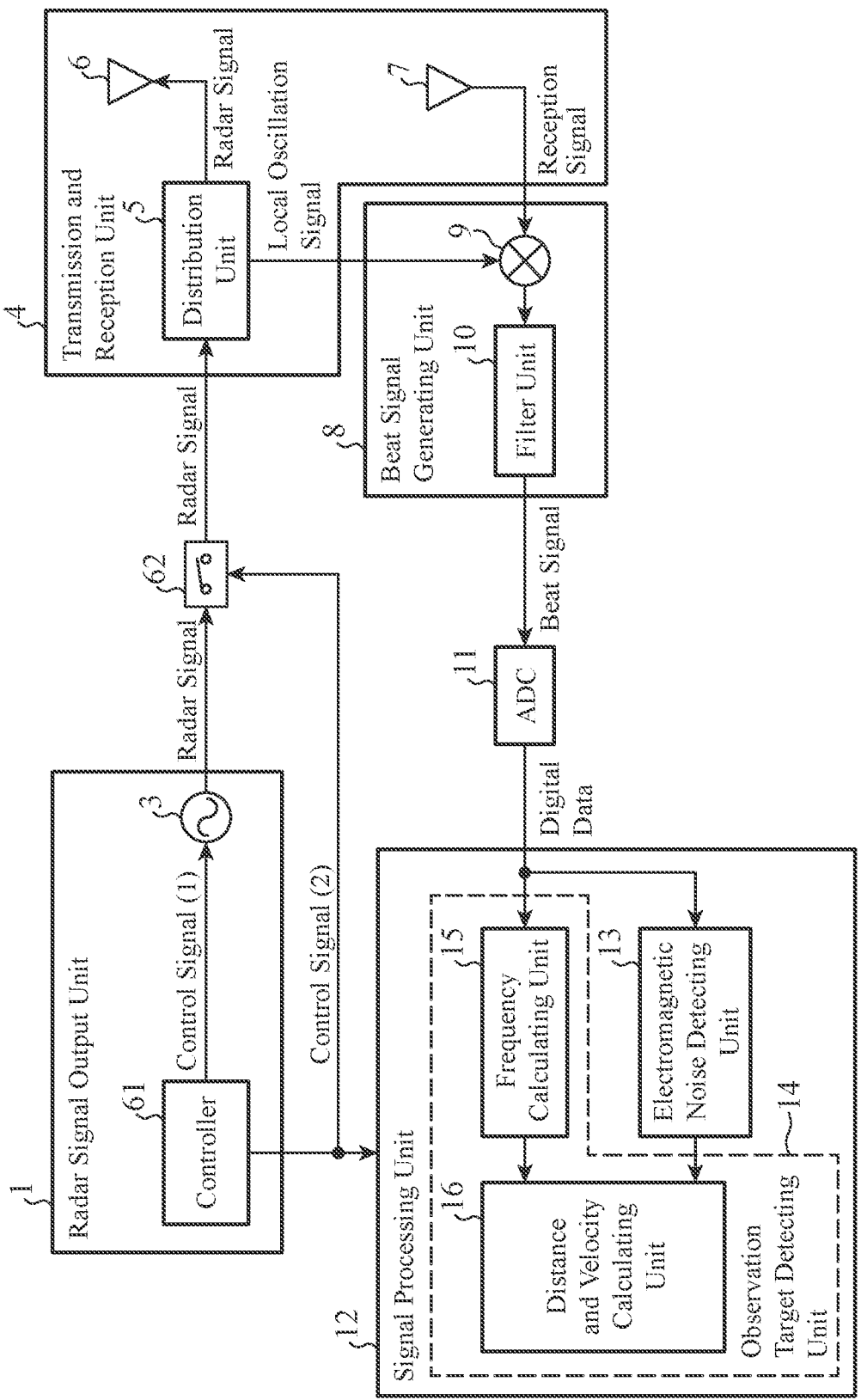
FIG. 13 is a configuration diagram illustrating a radar device according to a second embodiment.

FIG. 13 is a configuration diagram illustrating a radar device according to the second embodiment. In FIG. 13, the same symbol as that in FIG. 1 represents the same or a corresponding part, and thus description thereof is omitted.

A controller 61 outputs a control signal (1) giving an instruction on the output of a radar signal to a signal source 3. When the signal source 3 receives the control signal (1) from the controller 61, the signal source 3 outputs a frequency-modulated signal of a continuous wave to the switch 62 as a radar signal.

The controller 61 also outputs a control signal (2) indicating output timing of the radar signal to each of the switch 62 and a signal processing unit 12.

The switch 62 has one end connected to a radar signal output side of the radar signal output unit 1 and the other end connected to a radar signal input side of the transmission and reception unit 4.

The switch 62 repeatedly switches between connection and disconnection between the radar signal output side of the radar signal output unit 1 and the radar signal input side of the transmission and reception unit 4 in accordance with output timing indicated by the control signal (2) output from the controller 61.

When the radar signal input side is connected with the radar signal output side of the radar signal output unit 1 via the switch 62, the transmission and reception unit 4 transmits the radar signal output from the radar signal output unit 1 toward an observation target and receives the radar signal reflected by the observation target as a reflection wave.

Next, the operation of the radar device illustrated in FIG. 13 will be described.

Figure 14:
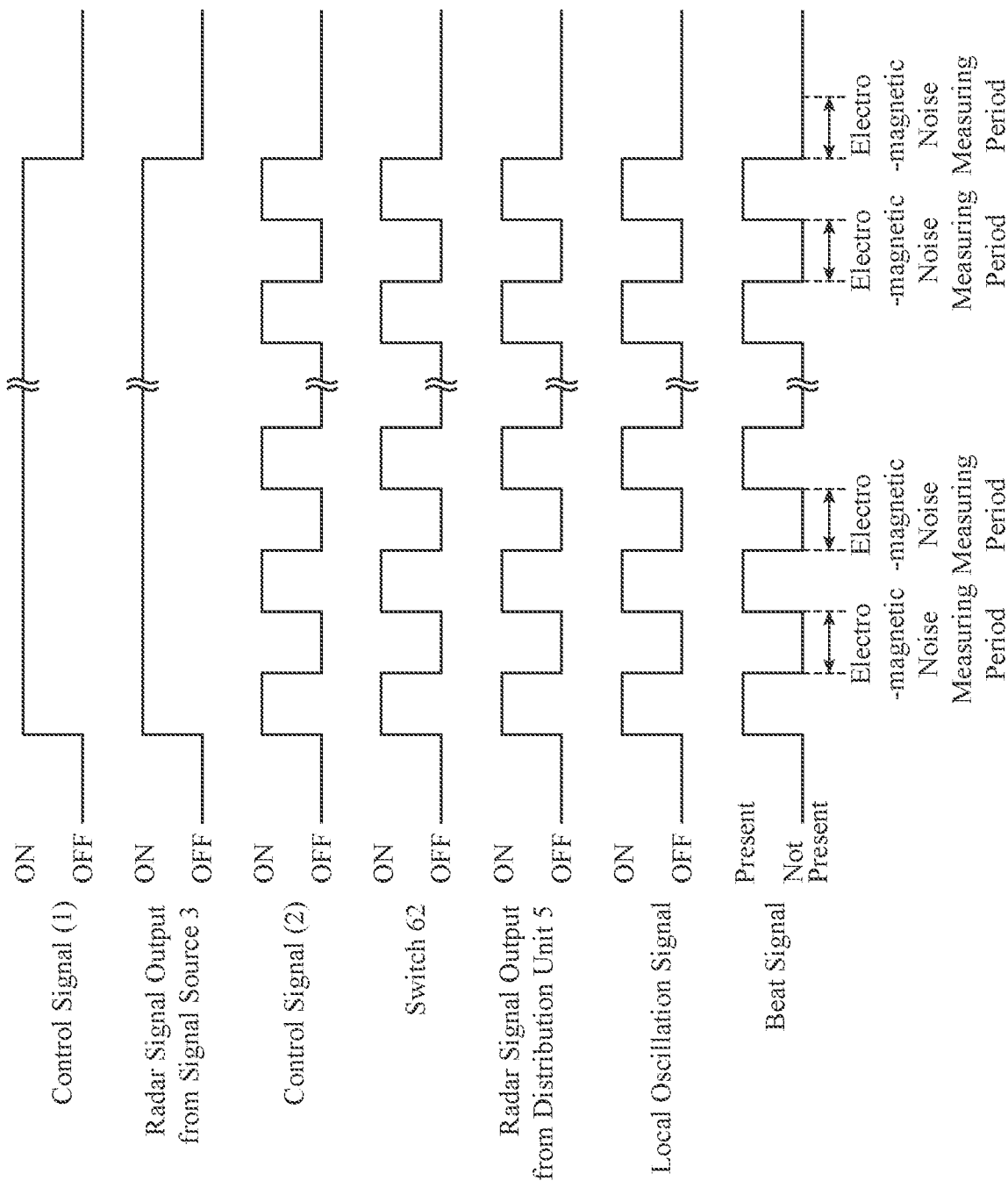
FIG. 14 is an explanatory diagram illustrating an example of measurement timing of an observation target in the radar device illustrated in FIG. 13.

FIG. 14 is an explanatory diagram illustrating an example of measurement timing of an observation target in the radar device illustrated in FIG. 13.

A controller 61 outputs a control signal (1) giving an instruction on the output of a radar signal to a signal source 3.

When the signal source 3 receives the control signal (1) from the controller 61, the signal source 3 outputs a frequency-modulated signal of a continuous wave to the switch 62 as a radar signal as illustrated in FIG. 14.

A period when the control signal (1) is ON is a period when the radar signal is output, and a period when the control signal (1) is OFF is a period when no radar signal is output.

The controller 61 also outputs the control signal (2) indicating output timing of the radar signal to each of the switch 62 and the signal processing unit 12 as illustrated in FIG. 14.

A period when the control signal (2) is ON is a period when the radar signal is output, and a period when the control signal (2) is OFF is a period when no radar signal is output.

In the radar device illustrated in FIG. 13, the period when the control signal (2) is ON occurs K times. Likewise, the period when the control signal (2) is turned OFF after being turned ON occurs K times. The control signal (2) is a signal similar to the control signal illustrated in FIG. 7.

The switch 62 repeatedly switches between connection and disconnection between the output side of the radar signal in the radar signal output unit 1 and the input side of the radar signal in the transmission and reception unit 4 in accordance with output timing indicated by the control signal (2) output from the controller 61.

As illustrated in FIG. 14, the switch 62 connects between the radar signal output side of the radar signal output unit 1 and the radar signal input side of the transmission and reception unit 4 during the period when the control signal (2) is ON.

As illustrated in FIG. 14, the switch 62 disconnects between the radar signal output side of the radar signal output unit 1 and the radar signal input side of the transmission and reception unit 4 during the period when the control signal (2) is OFF.

Therefore, the radar signal output from the radar signal output unit 1 is intermittently and repeatedly input to the transmission and reception unit 4, and thus the transmission and reception unit 4 can intermittently and repeatedly emit the radar signal into space as in the first embodiment.

The transmission and reception unit 4 can also intermittently and repeatedly output a local oscillation signal to a beat signal generating unit 8 as in the first embodiment.

Since the operation of the beat signal generating unit 8, an ADC 11, and the signal processing unit 12 is similar to that of the radar device illustrated in FIG. 1, detailed description thereof will be omitted.

The radar device illustrated in FIG. 13 includes the switch 62 for repeatedly switching between connection and disconnection between the radar signal output side in the radar signal output unit 1 and the radar signal input side in the transmission and reception unit 4. Therefore, even in a case where the radar device includes the signal source 3 for outputting a frequency-modulated signal of a continuous wave to the switch 62 as a radar signal, it is possible to suppress deterioration of the detection accuracy of an observation target even when electromagnetic noise is input to the ADC 11 as in the radar device illustrated in FIG. 1.

In the radar device illustrated in FIG. 13, the switch 62 is provided between the radar signal output side in the radar signal output unit 1 and the radar signal input side in the transmission and reception unit 4. However, this is merely an example, and as illustrated in FIG. 15, a switch 63 may be provided between the distribution unit 5 and the frequency mixing unit 9.

Figure 15:
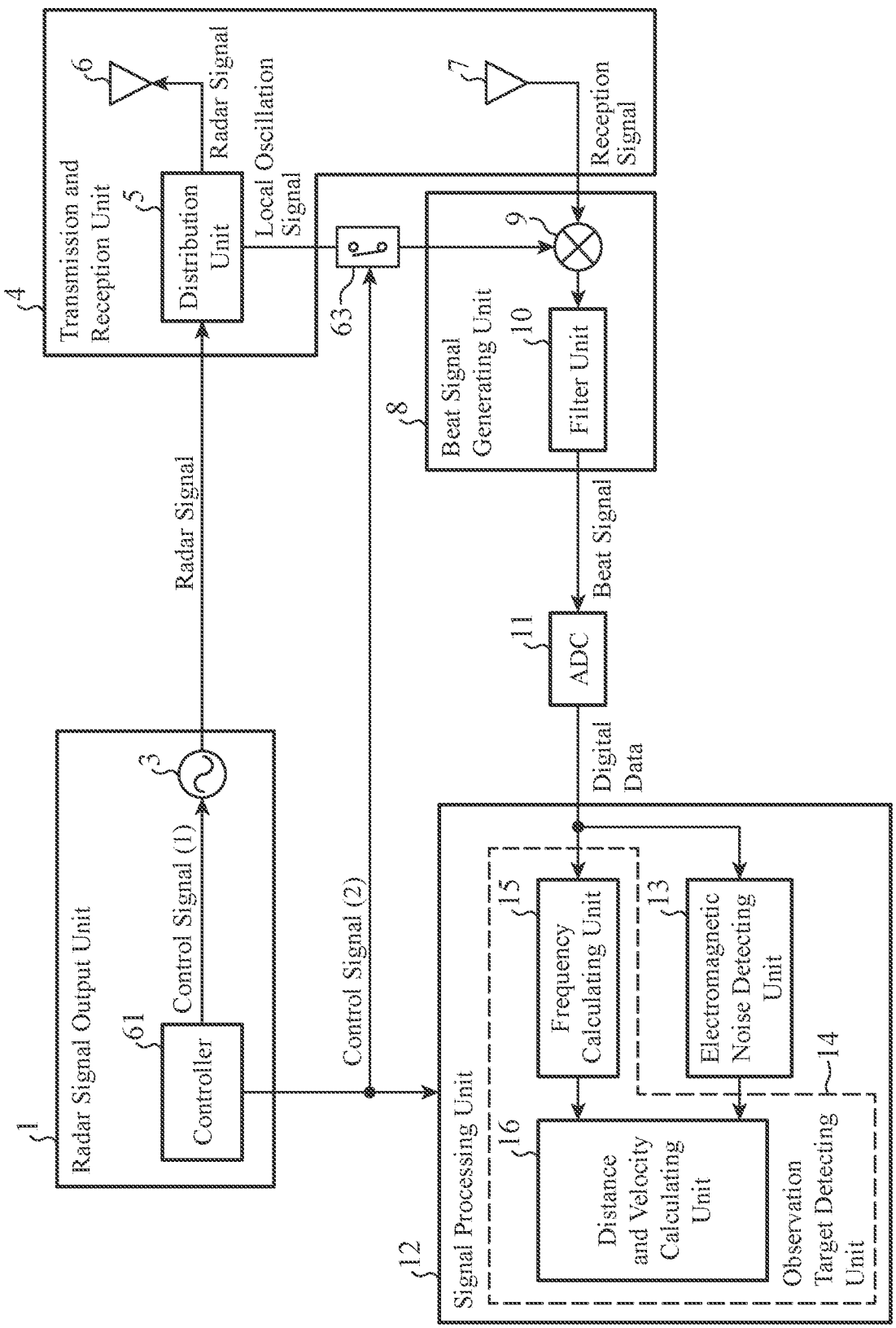
FIG. 15 is a configuration diagram illustrating another radar device according to the second embodiment.

FIG. 15 is a configuration diagram illustrating another radar device according to the second embodiment.

In the radar device illustrated in FIG. 15, the controller 61 outputs the control signal (2) to each of the switch 63 and the signal processing unit 12.

Since the frequency mixing unit 9 does not receive the local oscillation signal output from the distribution unit 5 during a period when the switch 63 is OFF, the frequency mixing unit 9 does not generate any beat signal and outputs no beat signal to the filter unit 10.

Like in the radar devices illustrated in FIGS. 1 and 13, the radar device illustrated in FIG. 15 can also suppress deterioration of the detection accuracy of an observation target even when electromagnetic noise is input to the ADC 11.

Third Embodiment

In a third embodiment, description will be given on a radar device including an electromagnetic noise detecting unit 71 which performs neither the calculation process of an electromagnetic noise frequency nor the calculation process of a Doppler frequency that corresponds to a relative velocity with respect to the source of the electromagnetic noise if the relative velocity with respect to an observation target is larger than a first threshold value.

Figure 16:
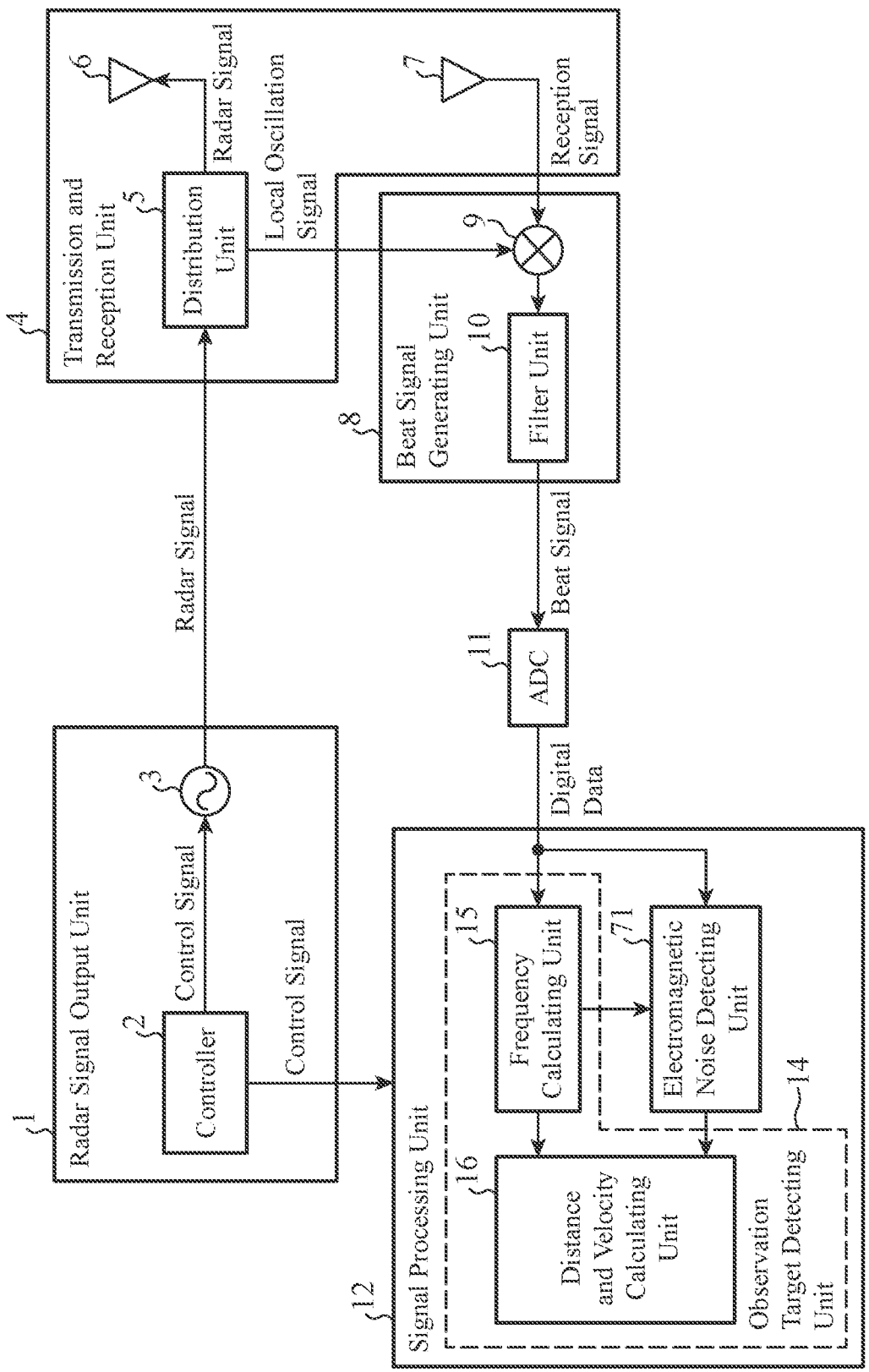
FIG. 16 is a configuration diagram illustrating a radar device according to a third embodiment.

FIG. 16 is a configuration diagram illustrating a radar device according to the third embodiment. In FIG. 16, the same symbol as that in FIG. 1 represents the same or a corresponding part, and thus description thereof is omitted.

Like in the first embodiment, a frequency calculating unit 15 calculates each of beat frequency $F_{sb\_r}$ that corresponds to the distance to an observation target and Doppler frequency $F_{sb\_v}$ that corresponds to the relative velocity with respect to the observation target using digital data in the period that has been specified among digital data output from an ADC 11.

The frequency calculating unit 15 outputs each of beat frequency $F_{sb\_r}$ that has been calculated and Doppler frequency $F_{sb\_v}$ that has been calculated to a distance and velocity calculating unit 16.

The frequency calculating unit 15 also outputs Doppler frequency $F_{sb\_v}$ that has been calculated to the electromagnetic noise detecting unit 71.

The electromagnetic noise detecting unit 71 is implemented by, for example, the electromagnetic noise detecting circuit 21 illustrated in FIG. 2.

Like the electromagnetic noise detecting unit 13 illustrated in FIG. 1, by referring to a control signal output from a controller 2, the electromagnetic noise detecting unit 71 specifies a period when no radar signal is output from a radar signal output unit 1 as a period when no radar signal is transmitted from a transmission and reception unit 4.

When one or more Doppler frequencies $F_{sb\_v}$ are calculated by the frequency calculating unit 15, the electromagnetic noise detecting unit 71 compares the relative velocity indicated by each of Doppler frequencies $F_{sb\_v}$ with a first threshold value. For example, in a case where there is one observation target and there is one type of electromagnetic noise, the frequency calculating unit 15 calculates two Doppler frequencies $F_{sb\_v}$, and thus the electromagnetic noise detecting unit 71 compares a relative velocity indicated by each of the two Doppler frequencies $F_{sb\_v}$ with the first threshold value.

The electromagnetic noise detecting unit 71 determines whether or not a relative velocity indicated by any one of a plurality of Doppler frequencies $F_{sb\_v}$ is less than or equal to the first threshold value on the basis of the comparison results between the relative velocity indicated by each of the Doppler frequencies $F_{sb\_v}$ and the first threshold value.

If it is determined that a relative velocity indicated by any of the Doppler frequencies $F_{sb\_v}$ is less than or equal to the first threshold value, the electromagnetic noise detecting unit 71 calculates each of frequency $F_{n\_r}$ of the electromagnetic noise input to the ADC 11 and Doppler frequency $F_{n\_v}$ that corresponds to the relative velocity with respect to the source of the electromagnetic noise using the digital data in the period that has been specified.

If it is determined that all the relative velocities indicated by the one or more Doppler frequencies $F_{sb\_v}$ are larger than the first threshold value, the electromagnetic noise detecting unit 71 performs neither the calculation process of electromagnetic noise frequency $F_{n\_r}$ nor the calculation process of Doppler frequency $F_{n\_v}$.

The first threshold value may be stored in an internal memory of a spectrum calculating unit 44 (see FIG. 17) in the electromagnetic noise detecting unit 71 or may be given from the outside of the device. The first threshold value is 0 or a value close to 0. As a value close to 0, for example, a value of 1 [km/hour] is conceivable. Alternatively, the first threshold value may be obtained from a result of performing an electromagnetic noise test in advance.

The electromagnetic noise detecting unit 71 outputs each of electromagnetic noise frequency $F_{n\_r}$ and Doppler frequency $F_{n\_v}$ that have been calculated to the distance and velocity calculating unit 16.

Figure 17:
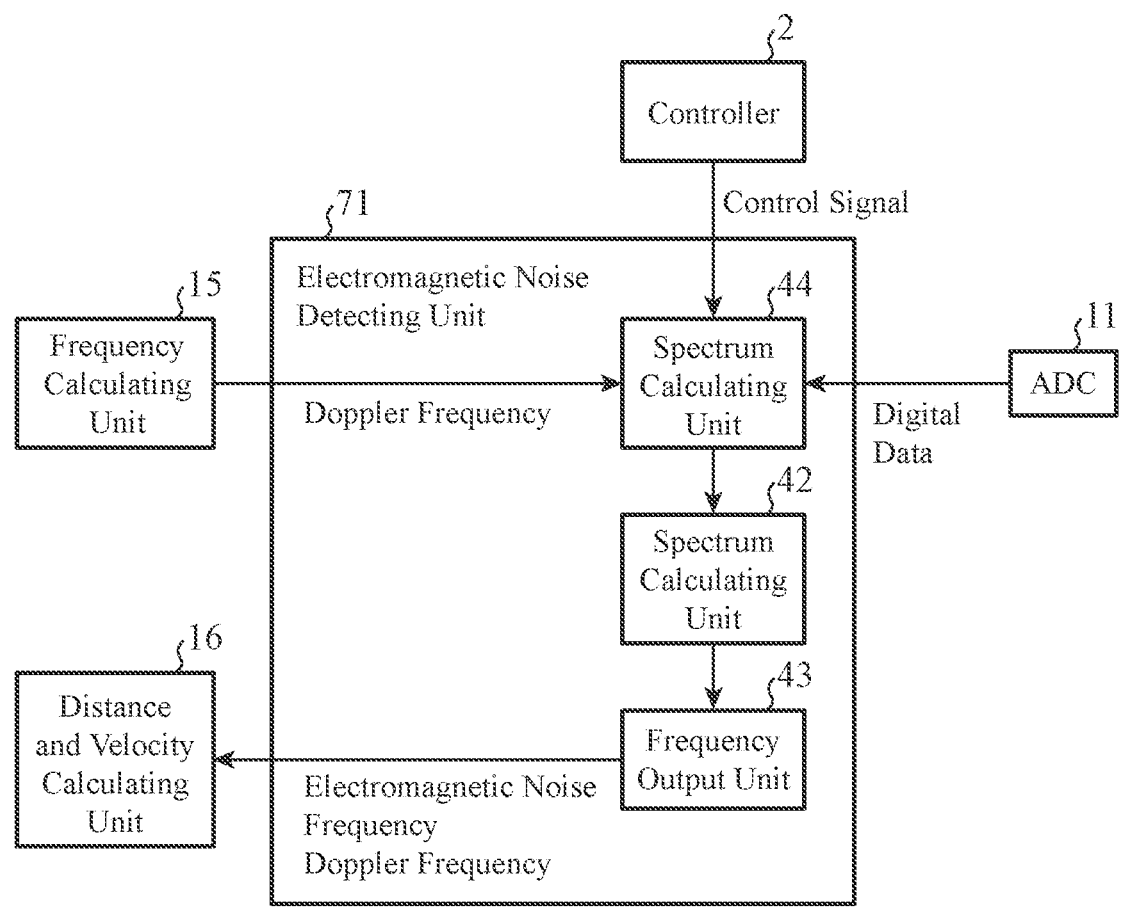
FIG. 17 is a configuration diagram illustrating an electromagnetic noise detecting unit 71 of a signal processing unit 12.

FIG. 17 is a configuration diagram illustrating the electromagnetic noise detecting unit 71 of the signal processing unit 12. In FIG. 17, the same symbol as that in FIG. 5 represents the same or a corresponding part, and thus description thereof is omitted.

Like the spectrum calculating unit 41 illustrated in FIG. 5, a spectrum calculating unit 44 specifies a period when no radar signal is output from the radar signal output unit 1 by referring to the control signal output from the controller 2.

When one or more Doppler frequencies $F_{sb\_v}$ are calculated by the frequency calculating unit 15, the spectrum calculating unit 44 compares the relative velocity indicated by each of the Doppler frequencies $F_{sb\_v}$ with the first threshold value.

The spectrum calculating unit 44 determines whether or not a relative velocity indicated by any one of a plurality of Doppler frequencies $F_{sb\_v}$ is less than or equal to the first threshold value on the basis of the comparison results between the relative velocity indicated by each of the Doppler frequencies $F_{sb\_v}$ and the first threshold value.

If the spectrum calculating unit 44 determines that a relative velocity indicated by any of the Doppler frequencies $F_{sb\_v}$ is less than or equal to the first threshold value, the spectrum calculating unit 44 calculates a first frequency spectrum related to electromagnetic noise by performing a Fourier transform, in the distance direction, on digital data in the period that has been specified among digital data output from the ADC 11.

Since digital data in the period that has been specified is repeatedly output from the ADC 11, the spectrum calculating unit 44 performs a Fourier transform, in the distance direction, on each of a plurality of pieces of digital data that are repeatedly output and thereby calculates a plurality of first frequency spectra related to the electromagnetic noise.

The spectrum calculating unit 44 outputs the plurality of first frequency spectra related to the electromagnetic noise that has been calculated to a spectrum calculating unit 42.

If the spectrum calculating unit 44 determines that all the relative velocities indicated by the one or more Doppler frequencies $F_{sb\_v}$ is greater than the first threshold value, the spectrum calculating unit 44 does not perform the process of calculating the first frequency spectrum related to the electromagnetic noise by performing a Fourier transform, in the distance direction, on the digital data in the period that has been specified.

Next, the operation of the radar device illustrated in FIG. 16 will be described.

Since the components other than the electromagnetic noise detecting unit 71 are similar to those in the first embodiment, the operation of the electromagnetic noise detecting unit 71 will be mainly described here.

The frequency calculating unit 15 calculates each of beat frequency $F_{sb\_r}$ that corresponds to the distance to the observation target and Doppler frequency $F_{sb\_v}$ that corresponds to the relative velocity with respect to the observation target like in the first embodiment.

Like in the first embodiment, the frequency calculating unit 15 outputs each of beat frequency $F_{sb\_r}$ and Doppler frequency $F_{sb\_v}$ that has been calculated to the distance and velocity calculating unit 16.

The frequency calculating unit 15 also outputs Doppler frequency $F_{sb\_v}$ that has been calculated to the electromagnetic noise detecting unit 71.

Like the spectrum calculating unit 41 illustrated in FIG. 5, the spectrum calculating unit 44 in the electromagnetic noise detecting unit 71 specifies a period when no radar signal is output from the radar signal output unit 1 by referring to the control signal output from the controller 2.

When one or more Doppler frequencies $F_{sb\_v}$ are calculated by the frequency calculating unit 15, the spectrum calculating unit 44 compares the relative velocity indicated by each of the Doppler frequencies $F_{sb\_v}$ with the first threshold value.

For example, in a case where there is one observation target and one type of electromagnetic noise, the frequency calculating unit 15 calculates two Doppler frequencies $F_{sb\_v}$. When two Doppler frequencies $F_{sb\_v}$ are calculated by the frequency calculating unit 15, the spectrum calculating unit 44 compares a relative velocity indicated by each of the two Doppler frequencies $F_{sb\_v}$ with the first threshold value.

When the relative velocity is almost 0, it is highly likely that the electromagnetic noise is input to the ADC 11 and superimposed on the beat signal. It is assumed that the electromagnetic noise, which is input to the ADC 11 when the relative velocity is almost 0, is generated from a component mounted on the radar device illustrated in FIG. 16.

On the other hand, when the relative velocity is high, it is unlikely that the electromagnetic noise is input to the ADC 11 and superimposed on the beat signal.

The spectrum calculating unit 44 determines whether or not a relative velocity indicated by any one of a plurality of Doppler frequencies $F_{sb\_v}$ is less than or equal to the first threshold value on the basis of the comparison results between the relative velocity indicated by each of the Doppler frequencies $F_{sb\_v}$ and the first threshold value.

If the spectrum calculating unit 44 determines that a relative velocity indicated by any of the Doppler frequencies $F_{sb\_v}$ is less than or equal to the first threshold value, the spectrum calculating unit 44 acquires the digital data in the period that has been specified among the digital data output from the ADC 11.

Like the spectrum calculating unit 41 illustrated in FIG. 5, the spectrum calculating unit 44 calculates the first frequency spectrum related to the electromagnetic noise by performing a Fourier transform, in the distance direction, on the digital data that has been acquired.

If the spectrum calculating unit 44 determines that all the relative velocities indicated by the one or more Doppler frequencies $F_{sb\_v}$ is greater than the first threshold value, the spectrum calculating unit 44 does not perform the process of calculating the first frequency spectrum related to the electromagnetic noise by performing a Fourier transform, in the distance direction, on the digital data in the period that has been specified.

Like the spectrum calculating unit 41 illustrated in FIG. 5, the spectrum calculating unit 44 calculates K first frequency spectra related to the electromagnetic noise and then outputs, to the spectrum calculating unit 42, the K first frequency spectra related to the electromagnetic noise that have been calculated.

When the spectrum calculating unit 41 outputs the K first frequency spectra, the spectrum calculating unit 42 acquires the K first frequency spectra.

Like the first embodiment, the spectrum calculating unit 42 calculates a second frequency spectrum related to the electromagnetic noise by performing a Fourier transform, in the relative velocity direction, on the K first frequency spectra that have been acquired.

When the frequency output unit 43 receives the second frequency spectrum from the spectrum calculating unit 42, the frequency output unit 43 detects peak values of spectrum values in the second frequency spectrum.

The frequency output unit 43 outputs the beat frequency of the peak values that have been detected to the distance and velocity calculating unit 16 as electromagnetic noise frequency $F_{n\_r}$.

The frequency output unit 43 outputs the Doppler frequency of the peak values that have been detected to the distance and velocity calculating unit 16 as Doppler frequency $F_{n\_v}$ that corresponds to the relative velocity with respect to the source of the electromagnetic noise.

In the above third embodiment, if a relative velocity indicated by any of one or more Doppler frequencies $F_{sb\_v}$ is less than or equal to the first threshold value when the one or more Doppler frequencies $F_{sb\_v}$ are calculated by the frequency calculating unit 15, the electromagnetic noise detecting unit 71 performs each of the calculation process of frequency $F_{n\_r}$ of the electromagnetic noise input to the ADC 11 and the calculation process of Doppler frequency $F_{n\_v}$ that corresponds to the relative velocity with respect to the source of the electromagnetic noise. The radar device is configured so that, if all of the relative velocities indicated by the one or more Doppler frequencies $F_{n\_v}$ are larger than the first threshold value, the electromagnetic noise detecting unit 71 performs neither the calculation process of frequency $F_{n\_r}$ of the electromagnetic noise input to the ADC 11 nor the calculation process of Doppler frequency $F_{n\_v}$ that corresponds to the relative velocity with respect to the source of the electromagnetic noise. Therefore, in the radar device, even when the electromagnetic noise is input to the ADC 11, deterioration of the detection accuracy of an observation target can be suppressed and the load of the calculation process of the electromagnetic noise detecting unit 71 can also be reduced as compared with the electromagnetic noise detecting unit 13 illustrated in FIG. 1.

In the radar device illustrated in FIG. 16, if it is determined that all the relative velocities indicated by the one or more Doppler frequencies $F_{n\_v}$ are larger than the first threshold value, the electromagnetic noise detecting unit 71 performs neither the calculation process of electromagnetic noise frequency $F_{n\_r}$ nor the calculation process of Doppler frequency $F_{n\_v}$.

If all of the relative velocities indicated by the one or more Doppler frequencies $F_{n\_v}$ are larger than the first threshold value, the controller 2 may perform control so that the period when no radar signal is output from the radar signal output unit 1 is shortened.

When the controller 2 shortens the period when no radar signal is output from the radar signal output unit 1, calculation cycles of the distance to the observation target and the relative velocity with respect to the observation target are each shortened, and the distance and the relative velocity are each calculated more often.

In the radar device illustrated in FIG. 16, the electromagnetic noise detecting unit 71 compares a relative velocity indicated by each of Doppler frequencies $F_{sb\_v}$ calculated by the frequency calculating unit 15 with the first threshold value. However, this is merely an example, and the electromagnetic noise detecting unit 71 may compare the difference between the relative velocity indicated by each of Doppler frequencies $F_{sb\_v}$ calculated by the frequency calculating unit 15 and the traveling velocity of the radar device illustrated in FIG. 16, which is the host radar device, and a second threshold value. In a case where the radar device illustrated in FIG. 16 is mounted on a vehicle such as an automobile, the electromagnetic noise detecting unit 71 can acquire the traveling velocity of the radar device illustrated in FIG. 16 from the vehicle.

The second threshold value may be stored in an internal memory of the spectrum calculating unit 44 (see FIG. 17) in the electromagnetic noise detecting unit 71 or may be given from the outside of the device. The second threshold value is 0 or a value close to 0. As a value close to 0, for example, a value of 1 [km/hour] is conceivable. Alternatively, the second threshold value may be obtained from a result of performing an electromagnetic noise test in advance.

In a case where the difference between the relative velocity indicated by Doppler frequency $F_{sb\_v}$ and the traveling velocity of the radar device illustrated in FIG. 16 is almost 0, it is likely that the electromagnetic noise is input to the ADC 11 and superimposed on the beat signal. It is assumed that the electromagnetic noise, which is input to the ADC 11 when the relative velocity is almost 0, is generated from a wireless power feeding device present in the vicinity of the radar device illustrated in FIG. 16. The wireless power feeding device is installed at, for example, a gas station or a convenience store and wirelessly charges the battery of an electric vehicle.

On the other hand, if the difference between the relative velocity indicated by Doppler frequency $F_{sb\_v}$ and the traveling velocity of the radar device illustrated in FIG. 16 is large, it is unlikely that the electromagnetic noise is input to the ADC 11 and superimposed on the beat signal. However, even in a case where the difference is large, there is a possibility that the electromagnetic noise is input to the ADC 11 and superimposed on the beat signal if the relative velocity indicated by Doppler frequency $F_{sb\_v}$ is almost 0.

The electromagnetic noise detecting unit 71 determines, on the basis of comparison results between a difference between a relative velocity indicated by each of Doppler frequencies $F_{sb\_v}$ calculated by the frequency calculating unit 15 and the traveling velocity of the radar device illustrated in FIG. 16 with the second threshold value, whether or not any of the differences is less than or equal to the second threshold value.

If it is determined that any of the differences is less than or equal to the second threshold value, the electromagnetic noise detecting unit 71 calculates each of frequency $F_{n\_r}$ of the electromagnetic noise input to the ADC 11 and Doppler frequency $F_{n\_v}$ that corresponds to the relative velocity with respect to the source of the electromagnetic noise using the digital data in the period that has been specified.

The electromagnetic noise detecting unit 71 outputs each of electromagnetic noise frequency $F_{n\_r}$ and Doppler frequency $F_{n\_v}$ that have been calculated to the distance and velocity calculating unit 16.

If it is determined that all the differences are larger than the second threshold value, the electromagnetic noise detecting unit 71 performs neither the calculation process of electromagnetic noise frequency $F_{n\_r}$ and the calculation process of Doppler frequency $F_{n\_v}$.

Fourth Embodiment

In a fourth embodiment, a radar device in which a radar signal output unit 80 changes the frequency bandwidth BW or sweep time T of a radar signal will be described.

Figure 18:
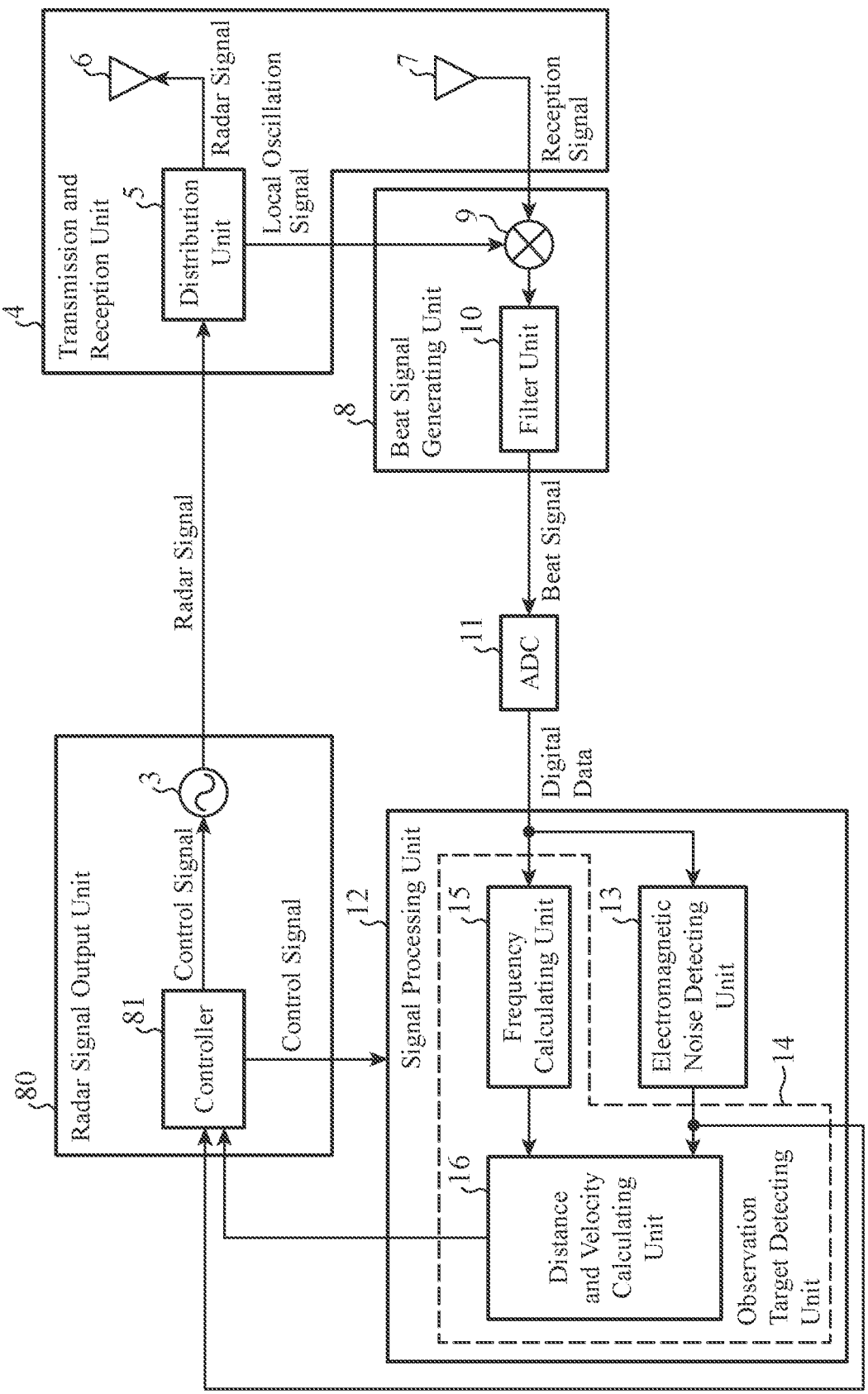
FIG. 18 is a configuration diagram illustrating a radar device according to a fourth embodiment.

FIG. 18 is a configuration diagram illustrating a radar device according to the fourth embodiment. In FIG. 18, the same symbol as that in FIG. 1 represents the same or a corresponding part, and thus description thereof is omitted.

The radar signal output unit 80 includes a controller 81 and a signal source 3.

Like the radar signal output unit 1 illustrated in FIG. 1, the radar signal output unit 80 intermittently and repeatedly outputs a frequency-modulated signal whose frequency changes with the passage of time to a transmission and reception unit 4 as a radar signal.

The radar signal output unit 80 changes the frequency bandwidth BW of the radar signal or the sweep time T of the radar signal when a predetermined condition is satisfied.

Like the controller 2 illustrated in FIG. 1, the controller 81 outputs a control signal indicating output timing of the radar signal to each of the signal source 3 and a signal processing unit 12.

The controller 81 acquires beat frequency $F_{sb\_r}$ that corresponds to the distance to an observation target that has been calculated by a distance and velocity calculating unit 16 among beat frequencies $F_{sb\_r}$ calculated by the frequency calculating unit 15.

The controller 81 acquires Doppler frequency $F_{sb\_v}$ that corresponds to the relative velocity with respect to the observation target calculated by the distance and velocity calculating unit 16 among Doppler frequencies $F_{sb\_v}$ calculated by the frequency calculating unit 15.

The controller 81 acquires each of electromagnetic noise frequency $F_{n\_r}$ and Doppler frequency $F_{n\_v}$ that corresponds to the relative velocity with respect to the source of the electromagnetic noise calculated by an electromagnetic noise detecting unit 13.

The controller 81 compares the difference between beat frequency $F_{sb\_r}$ that corresponds to the distance to the observation target that has been acquired and electromagnetic noise frequency $F_{n\_r}$ that has been acquired with a third threshold value.

The controller 81 compares the difference between Doppler frequency $F_{sb\_v}$ that corresponds to the relative velocity with respect to the observation target that has been acquired and Doppler frequency $F_{n\_v}$ that corresponds to the relative velocity with respect to the source of the electromagnetic noise that has been acquired with a fourth threshold value.

If the difference between beat frequency $F_{sb\_r}$ and electromagnetic noise frequency $F_{n\_r}$ is less than or equal to the third threshold value and the difference between Doppler frequency $F_{sb\_v}$ and Doppler frequency $F_{n\_v}$ is less than or equal to the fourth threshold value, it is assumed that a predetermined condition is satisfied, and the controller 81 controls the signal source 3 so as to change the frequency bandwidth BW of the radar signal or the sweep time T of the radar signal.

Each of the third threshold value and the fourth threshold value may be stored in an internal memory of the controller 81 or may be given from the outside of the device.

Each of the third threshold value and the fourth threshold value is 0 or a value close to 0. As a value close to 0, for example, a value of 1 or 2 [Hz] is conceivable. Alternatively, each of the third threshold value and the fourth threshold value may be obtained from a result of performing an electromagnetic noise test in advance.

Next, the operation of the radar device illustrated in FIG. 18 will be described.

Since the components other than the radar signal output unit 80 are similar to those in the first embodiment, the operation of the radar signal output unit 80 will be mainly described here.

The distance and velocity calculating unit 16 calculates each of the distance to the observation target and the relative velocity with respect to the observation target like in the first embodiment.

The distance and velocity calculating unit 16 outputs beat frequency $F_{sb\_r}$ that corresponds to the distance to the observation target that has been calculated to the controller 81 and outputs Doppler frequency $F_{sb\_v}$ that corresponds to the relative velocity with respect to the observation target that has been calculated to the controller 81.

Here, for the sake of simplicity of explanation, it is assumed that the number of observation targets is one and that the distance and velocity calculating unit 16 outputs only one set of beat frequency $F_{sb\_r}$ and Doppler frequency $F_{sb\_v}$.

Like in the first embodiment, the electromagnetic noise detecting unit 13 calculates each of electromagnetic noise frequency $F_{n\_r}$ and Doppler frequency $F_{n\_v}$ and then outputs each of electromagnetic noise frequency $F_{n\_r}$ and Doppler frequency $F_{n\_v}$ that have been calculated to the controller 81.

Here, for the sake of simplicity of explanation, it is assumed that the number of types of electromagnetic noise is one and only one set of electromagnetic noise frequency $F_{n\_r}$ and Doppler frequency $F_{n\_v}$ is output.

The controller 81 acquires each of beat frequency $F_{sb\_r}$ and Doppler frequency $F_{sb\_v}$ output from the distance and velocity calculating unit 16 and acquires each of electromagnetic noise frequency $F_{n\_r}$ and the Doppler frequency $F_{n\_v}$ output from the electromagnetic noise detecting unit 13.

The controller 81 compares the difference between beat frequency $F_{sb\_r}$ that has been acquired and electromagnetic noise frequency $F_{n\_r}$ that has been acquired with the third threshold value.

The controller 81 compares the difference between Doppler frequency $F_{sb\_v}$ that has been acquired and Doppler frequency $F_{n\_v}$ that has been acquired with the fourth threshold value.

If the difference between beat frequency $F_{sb\_r}$ and electromagnetic noise frequency $F_{n\_r}$ is almost 0 and the difference between Doppler frequency $F_{sb\_v}$ and the Doppler frequency $F_{n\_v}$ is almost 0, it is difficult to remove the electromagnetic noise that is superimposed on the beat signal.

If the difference between beat frequency $F_{sb\_r}$ and electromagnetic noise frequency $F_{n\_r}$ is less than or equal to the third threshold value and the difference between Doppler frequency $F_{sb\_v}$ and Doppler frequency $Fi_u$ is less than or equal to the fourth threshold value, the controller 81 controls the signal source 3 so as to change the frequency bandwidth BW of the radar signal or the sweep time T of the radar signal.

When the controller 81 changes the frequency bandwidth BW of the radar signal or the sweep time T of the radar signal, the spectrum values of the observation target and the spectrum values of the electromagnetic noise are integrated to different beat frequencies or different Doppler frequencies.

Therefore, the distance and velocity calculating unit 16 can calculate each of the distance to the observation target and the relative velocity with respect to the observation target without being affected by the electromagnetic noise that is superimposed on the beat signal.

In the above fourth embodiment, the radar device is configured so that the radar signal output unit 80 changes the frequency bandwidth BW of the radar signal or the sweep time T of the radar signal if the difference between the beat frequency that corresponds to the distance to the observation target that has been calculated by the distance and velocity calculating unit 16, among beat frequencies calculated by the frequency calculating unit 15, and the electromagnetic noise frequency calculated by the electromagnetic noise detecting unit 13 is less than or equal to the third threshold value and the difference between the Doppler frequency that corresponds to the relative velocity with respect to the observation target calculated by the distance and velocity calculating unit 16, among Doppler frequencies calculated by the frequency calculating unit 15, and Doppler frequency calculated by the electromagnetic noise detecting unit 13 is less than or equal to the fourth threshold value. Therefore, in the radar device, even when the difference between beat frequency $F_{sb\_r}$ and electromagnetic noise frequency $F_{n\_r}$ is almost 0 and the difference between Doppler frequency $F_{sb\_v}$ and the Doppler frequency $F_{n\_v}$ is almost 0, it is possible to suppress deterioration of the detection accuracy of an observation target accompanied with input of electromagnetic noise to the ADC 11.

Fifth Embodiment

In a fifth embodiment, description will be given on an in-vehicle device on which the radar device of any one of the first to fourth embodiments and sixth and seventh embodiments described later is mounted.

Figure 19:
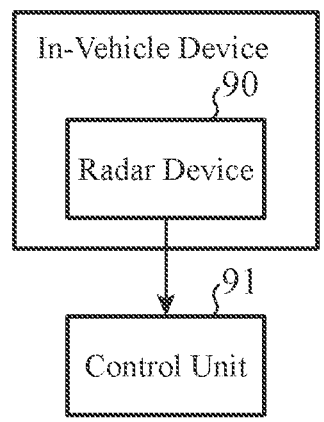
FIG. 19 is a configuration diagram illustrating an in-vehicle device according to a fifth embodiment.

FIG. 19 is a configuration diagram illustrating an in-vehicle device according to the fifth embodiment.

In FIG. 19, a radar device 90 is the radar device according to any one of the first to fourth embodiments.

The radar device 90 outputs the distance to an observation target and the relative velocity with respect to the observation target calculated by the distance and velocity calculating unit 16 of the observation target detecting unit 14 to a control unit 91 of an automobile.

The radar device 90 further outputs each of electromagnetic noise frequency $F_{n\_r}$ and Doppler frequency $F_{n\_v}$ that corresponds to the relative velocity with respect to the source of the electromagnetic noise calculated by the electromagnetic noise detecting unit 13 to the control unit 91 of the automobile.

The control unit 91 is a device for controlling the engine, the steering, the brake, or the like of the automobile.

Next, the operation of the in-vehicle device illustrated in FIG. 19 will be described.

When the distance and velocity calculating unit 16 calculates each of the distance to the observation target and the relative velocity with respect to the observation target, the radar device 90 outputs each of the distance to the observation target and the relative velocity with respect to the observation target to the control unit 91.

When the electromagnetic noise detecting unit 13 calculates each of electromagnetic noise frequency $F_{n\_r}$ and Doppler frequency $F_{n\_v}$, the radar device 90 outputs each of electromagnetic noise frequency $F_{n\_r}$ and Doppler frequency $F_{n\_v}$ to the control unit 91.

When each of the distance to the observation target and the relative velocity with respect to the observation target are acquired from the radar device 90, the control unit 91 determines, for example, the risk of collision between the automobile mounted with the in-vehicle device illustrated in FIG. 19 and the observation target on the basis of the distance and the relative velocity that have been acquired. Any determination method may be used as long as the risk of collision can be determined, and it is assumed that the control unit 91 uses a known determination method.

When the control unit 91 determines that there is a risk of collision, for example, the control unit 91 automatically activates the brake of the automobile.

In addition, when the control unit 91 determines that there is a risk of collision, for example, the control unit 91 controls the steering so that the traveling direction of the automobile changes.

Furthermore, the control unit 91 performs, for example, automatic driving of the automobile on the basis of a combination of sensor information detected by a sensor (not illustrated), the distance to the observation target that has been acquired, and the relative velocity with respect to the observation target that has been acquired.

The control unit 91 determines, for example, the reliability of each of the distance to the observation target that has been acquired and the relative velocity with respect to the observation target that has been acquired on the basis of electromagnetic noise frequency $F_{n\_r}$ and Doppler frequency $F_{n\_v}$ output from the radar device 90. Any determination method may be used as long as the reliability can be determined, and it is assumed that the control unit 91 uses a known determination method.

When the control unit 91 determines that the reliability is high, for example, the control unit 91 performs automatic driving of the automobile using each of the distance to the observation target that has been acquired and the relative velocity with respect to the observation target that has been acquired.

When the control unit 91 determines that the reliability is low, for example, when performing automatic driving of the automobile, the control unit 91 uses neither the distance to the observation target that has been acquired nor the relative velocity with respect to the observation target that has been acquired.

In the above fifth embodiment, the radar device is configured so that the observation target detecting unit 14 outputs each of the distance to the observation target and the relative velocity with respect to the observation target calculated by the distance and velocity calculating unit 16 to the control unit 91 of the automobile and outputs each of the beat frequency and the Doppler frequency calculated by the electromagnetic noise detecting unit 13 to the control unit 91. Therefore, for example, when the control unit 91 controls the automobile using each of the distance to the observation target and the relative velocity with respect to the observation target, it is possible to determine the reliability of each of the distance to the observation target and the relative velocity with respect to the observation target.

Sixth Embodiment

In a sixth embodiment, a radar device will be described in which an electromagnetic noise detecting unit 72 performs a Fourier transform, in the relative velocity direction, on spectrum values of beat frequency $F_{sb\_r}$ calculated by a frequency calculating unit 15 among a plurality of spectrum values included in a first frequency spectrum.

Figure 20:
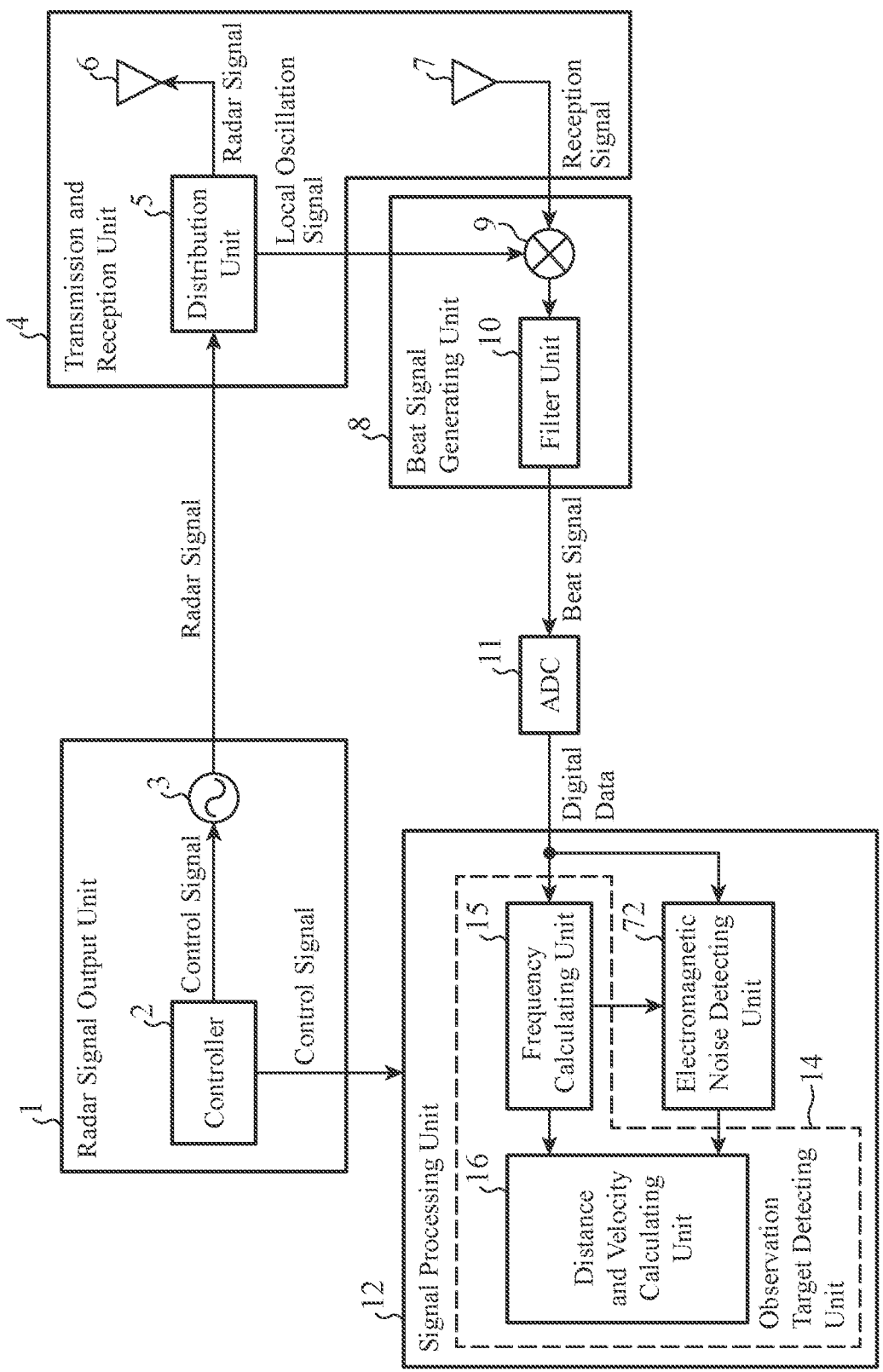
FIG. 20 is a configuration diagram illustrating a radar device according to a sixth embodiment.

FIG. 20 is a configuration diagram illustrating a radar device according to the sixth embodiment. In FIG. 20, the same symbol as that in FIG. 1 represents the same or a corresponding part, and thus description thereof is omitted.

In the radar device illustrated in FIG. 20, a frequency calculating unit 15 outputs beat frequency $F_{sb\_r}$ that has been calculated to an electromagnetic noise detecting unit 72.

The electromagnetic noise detecting unit 72 is implemented by, for example, the electromagnetic noise detecting circuit 21 illustrated in FIG. 2.

Like the electromagnetic noise detecting unit 13 illustrated in FIG. 1, by referring to a control signal output from a controller 2, the electromagnetic noise detecting unit 72 specifies a period when no radar signal is output from a radar signal output unit 1 as a period when no radar signal is transmitted from a transmission and reception unit 4.

The electromagnetic noise detecting unit 72 calculates a first frequency spectrum related to electromagnetic noise input to an ADC 11 by performing a Fourier transform, in the distance direction, on digital data in the period that has been specified among digital data output from the ADC 11.

The electromagnetic noise detecting unit 72 acquires spectrum values of beat frequency $F_{sb\_r}$ calculated by the frequency calculating unit 15 from a plurality of spectrum values included in the first frequency spectrum.

The electromagnetic noise detecting unit 72 calculates a second frequency spectrum related to the electromagnetic noise by performing a Fourier transform, in the relative velocity direction, on the spectrum values of beat frequency $F_{sb\_r}$.

Like the electromagnetic noise detecting unit 13 illustrated in FIG. 1, the electromagnetic noise detecting unit 72 calculates each of electromagnetic noise frequency $F_{n\_r}$ and Doppler frequency $F_{n\_v}$ that corresponds to the relative velocity with respect to the source of the electromagnetic noise from the second frequency spectrum.

The electromagnetic noise detecting unit 72 outputs each of electromagnetic noise frequency $F_{n\_r}$ and Doppler frequency $F_{n\_v}$ to the distance and velocity calculating unit 16.

Figure 21:
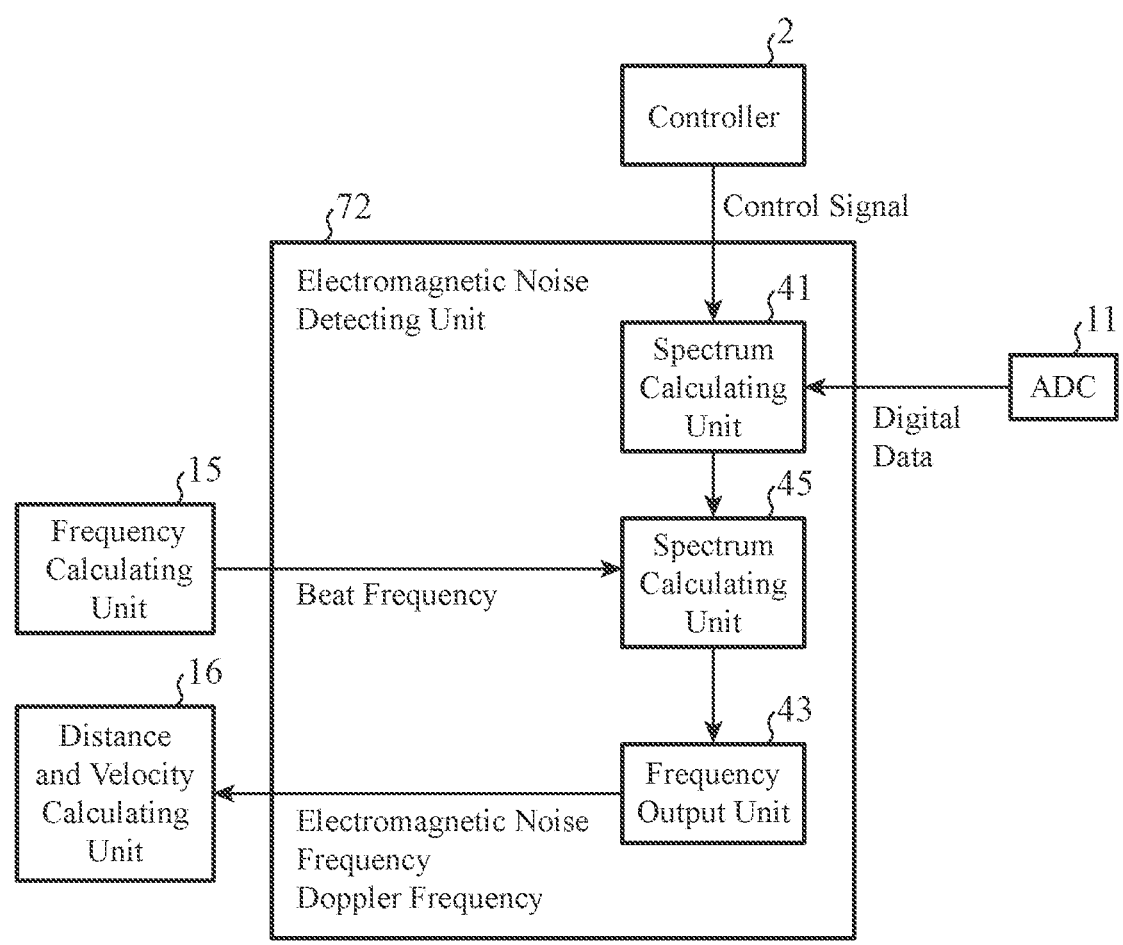
FIG. 21 is a configuration diagram illustrating an electromagnetic noise detecting unit 72 of a signal processing unit 12.

FIG. 21 is a configuration diagram illustrating the electromagnetic noise detecting unit 72 in the signal processing unit 12. In FIG. 21, the same symbol as that in FIG. 5 represents the same or a corresponding part, and thus description thereof is omitted.

A spectrum calculating unit 45 acquires a plurality of first frequency spectra output from a spectrum calculating unit 41.

The spectrum calculating unit 45 acquires beat frequency $F_{sb\_r}$ output from the frequency calculating unit 15.

The spectrum calculating unit 45 acquires the spectrum values of beat frequency $F_{sb\_r}$ calculated by the frequency calculating unit 15 from a plurality of spectrum values included in each of the plurality of first frequency spectra.

The spectrum calculating unit 45 calculates the second frequency spectrum related to the electromagnetic noise by performing a Fourier transform, in the relative velocity direction, on the spectrum values of beat frequency $F_{sb\_r}$.

The spectrum calculating unit 45 outputs the second frequency spectrum that has been calculated to a frequency output unit 43.

Next, the operation of the radar device illustrated in FIG. 20 will be described.

Since the components other than the electromagnetic noise detecting unit 72 are similar to those in the radar device illustrated in FIG. 1, the operation of the electromagnetic noise detecting unit 72 will be mainly described here.

Figure 22:
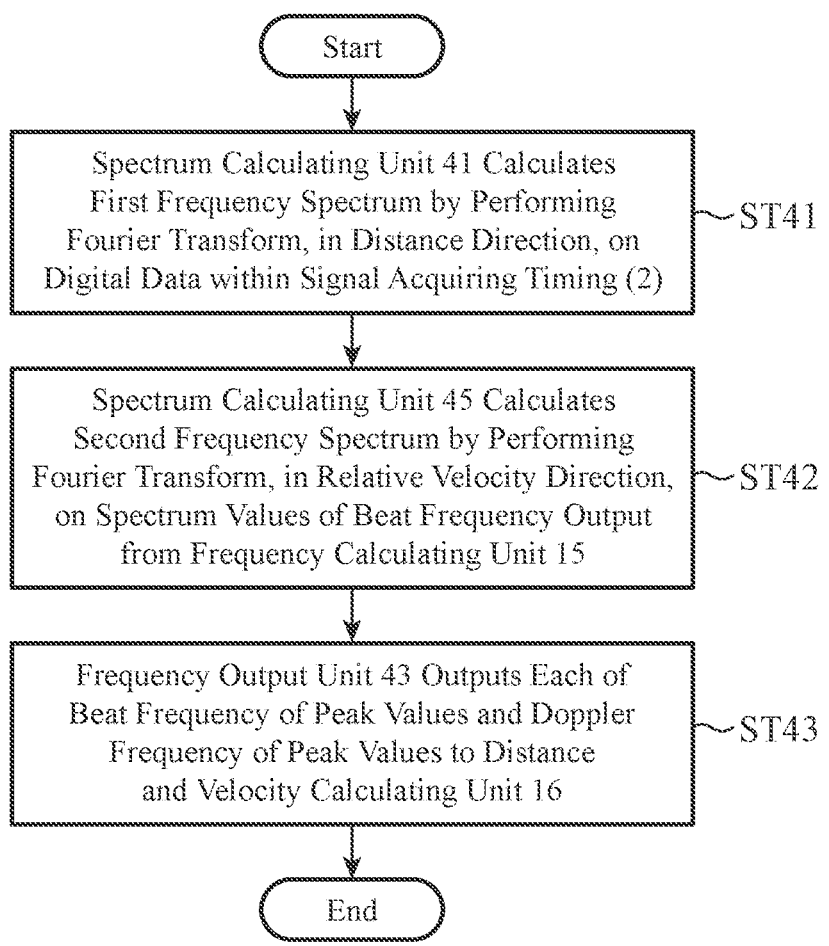
FIG. 22 is a flowchart illustrating a calculation process of an electromagnetic noise frequency and a Doppler frequency in the electromagnetic noise detecting unit 72.

FIG. 22 is a flowchart illustrating the calculation process of electromagnetic noise frequency $F_{n\_r}$ and Doppler frequency $F_{n\_v}$ in the electromagnetic noise detecting unit 72.

Figure 23:
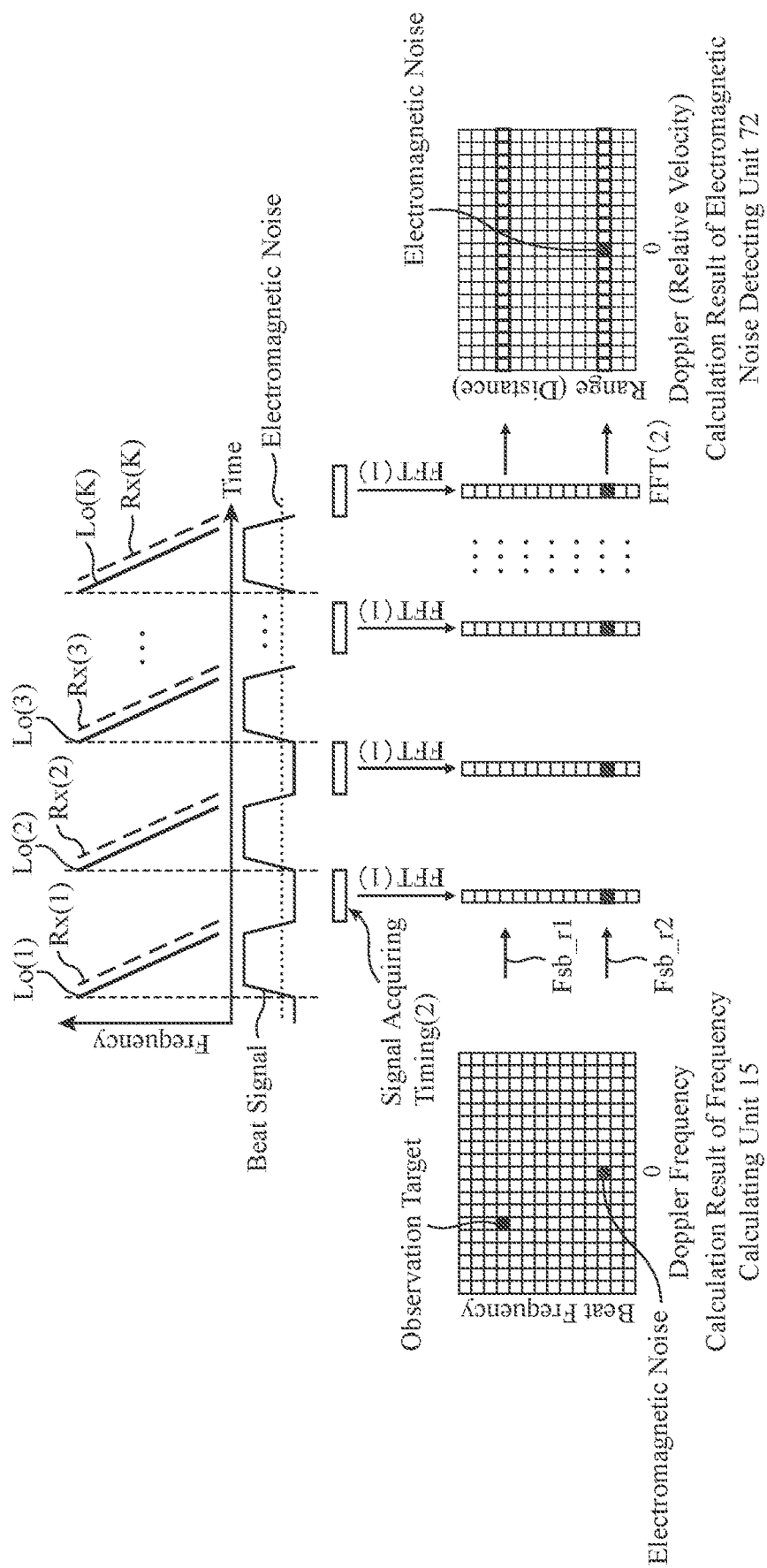
FIG. 23 is an explanatory diagram illustrating a calculation process of an electromagnetic noise frequency and a Doppler frequency in the electromagnetic noise detecting unit 72.

FIG. 23 is an explanatory diagram illustrating the calculation process of electromagnetic noise frequency $F_{n\_r}$ and Doppler frequency $F_{n\_v}$ in the electromagnetic noise detecting unit 72.

In FIG. 23, Lo (1), . . . , Lo (K) denote local oscillation signals output from the distribution unit 5 to the frequency mixing unit 9. Symbols Rx (1), . . . , Rx (K) denote reception signals output from the reception antenna 7 to the frequency mixing unit 9. Symbols $F_{sb\_r}1$ and $F_{sb\_r}2$ denote beat frequencies output from the frequency calculating unit 15.

In the example of FIG. 23, electromagnetic noise of a continuous wave having a constant frequency is input to the ADC 11.

Signal acquiring timing (2) indicates the timing at which the spectrum calculating unit 41 acquires the digital data output from the ADC 11. The signal acquiring timing (2) is included in the period when no radar signal is output from the radar signal output unit 1, and the length of signal acquiring timing (2) is approximately the same as one cycle of the local oscillation signal.

In the example of FIG. 23, the length of the signal acquiring timing (2) is approximately the same as one cycle of the local oscillation signal. However, this is merely an example, and the length of the signal acquiring timing (2) may be different from one cycle of the local oscillation signal. In a case where a period when no radar signal is output from the radar signal output unit 1 is shorter than a period when the radar signal is output from the radar signal output unit 1, although the resolution of electromagnetic noise that can be detected is deteriorated, it is possible to detect whether or not there is electromagnetic noise.

The frequency calculating unit 15 calculates each of beat frequency $F_{sb\_r}$ that corresponds to the distance to the observation target and Doppler frequency $F_{sb\_v}$ that corresponds to the relative velocity with respect to the observation target like in the first embodiment.

Like in the first embodiment, the frequency calculating unit 15 outputs each of beat frequency $F_{sb\_r}$ and Doppler frequency $F_{sb\_v}$ that has been calculated to a distance and velocity calculating unit 16.

The frequency calculating unit 15 also outputs beat frequency $F_{sb\_r}$ that has been calculated to the spectrum calculating unit 45 of the electromagnetic noise detecting unit 72.

Like in the first embodiment, the spectrum calculating unit 41 of the electromagnetic noise detecting unit 72 specifies a period when no radar signal is output from the radar signal output unit 1 as a period when no radar signal is transmitted from the transmission and reception unit 4 by referring to the control signal output from the controller 2.

Like in the first embodiment, the spectrum calculating unit 41 calculates a first frequency spectrum related to electromagnetic noise input to the ADC 11 by performing a Fourier transform, in the distance direction, on digital data in the period that has been specified among digital data output from the ADC 11 (step ST41 in FIG. 22).

In FIG. 23, FFT (1) denotes a Fourier transform in the distance direction by the spectrum calculating unit 41.

When the digital data is Fourier-transformed in the distance direction by the spectrum calculating unit 41, the spectrum values of the electromagnetic noise are integrated to Doppler frequency $F_{n\_v}$ that corresponds to the distance from the radar device illustrated in FIG. 20 and the source of the electromagnetic noise.

In the example of FIG. 23, since the OFF period of the control signal output from the controller 2 occurs K times, the spectrum calculating unit 41 performs a Fourier transform on each of the K pieces of digital data that are different from each other in the distance direction and thereby calculates K first frequency spectra.

The spectrum calculating unit 41 outputs the K first frequency spectra that have been calculated to the spectrum calculating unit 45.

The spectrum calculating unit 45 acquires the K first frequency spectra output from the spectrum calculating unit 41.

The spectrum calculating unit 45 acquires beat frequency $F_{sb\_r}$ output from the frequency calculating unit 15.

The spectrum calculating unit 45 acquires spectrum values of beat frequency $F_{sb\_r}$ calculated by the frequency calculating unit 15 from a plurality of spectrum values included in each of the plurality of first frequency spectra that has been acquired.

The spectrum calculating unit 45 calculates a second frequency spectrum related to the electromagnetic noise by performing a Fourier transform, in the relative velocity direction, on the spectrum values of beat frequency $F_{sb\_r}$ that have been acquired (step ST42 in FIG. 22).

In the example of FIG. 23, beat frequency $F_{sb\_r}$ output from the frequency calculating unit 15 includes two beat frequencies of beat frequency $F_{sb\_r1}$ and beat frequency $F_{sb\_r2}$. Therefore, the spectrum calculating unit 45 calculates the second frequency spectrum related to the electromagnetic noise by performing a Fourier transform, in the relative velocity direction, on spectrum values of beat frequency $F_{sb\_r1}$ and spectrum values of beat frequency $F_{sb\_r2}$.

Of a plurality of spectrum values included in a first frequency spectrum, spectrum values other than the spectrum values of the two beat frequencies $F_{sb\_r1}$ and $F_{sb\_r2}$ are not Fourier-transformed in the relative velocity direction by the spectrum calculating unit 45. Therefore, the load of the Fourier transform process in the spectrum calculating unit 45 is reduced as compared with the load of the Fourier transform process in the spectrum calculating unit 42 illustrated in FIG. 5.

The spectrum calculating unit 45 outputs the second frequency spectrum that has been calculated to the frequency output unit 43.

When the frequency output unit 43 receives the second frequency spectrum from the spectrum calculating unit 45, like in the first embodiment, the frequency output unit 43 detects peak values of spectrum values in the second frequency spectrum.

The frequency output unit 43 outputs the beat frequency of the peak values that have been detected to the distance and velocity calculating unit 16 as electromagnetic noise frequency $F_{n\_r}$ (step ST43 in FIG. 22).

The frequency output unit 43 outputs the Doppler frequency of the peak values that have been detected to the distance and velocity calculating unit 16 as Doppler frequency $F_{n\_v}$ that corresponds to the relative velocity with respect to the source of the electromagnetic noise (step ST43 in FIG. 22).

In the above sixth embodiment, the electromagnetic noise detecting unit 72 calculates the first frequency spectrum related to the electromagnetic noise input to an ADC 11 by performing a Fourier transform, in the distance direction, on digital data in the period when no radar signal is output from the radar signal output unit 1 among digital data output from the ADC 11. The radar device illustrated in FIG. 20 is configured so that the electromagnetic noise detecting unit 72 further calculates each of frequency $F_{n\_r}$ of the electromagnetic noise input to the ADC 11 and Doppler frequency $F_{n\_v}$ that corresponds to the relative velocity with respect to the source of the electromagnetic noise by performing a Fourier transform, in the relative velocity direction, on the spectrum values of the beat frequencies calculated by the frequency calculating unit 15 among the plurality of spectrum values included in the first frequency spectrum. Therefore, the electromagnetic noise detecting unit 72 of the radar device illustrated in FIG. 20 can reduce the load of the calculation process of Doppler frequency $F_{n\_v}$ as compared with the electromagnetic noise detecting unit 13 of the radar device illustrated in FIG. 1.

Seventh Embodiment

In a seventh embodiment, a radar device will be described which includes an electromagnetic noise detecting unit 73 for acquiring part of digital data out of digital data in a period when no radar signal is output from a radar signal output unit 1 on the basis of the difference between a signal strength output from a frequency calculating unit 17 and a fifth threshold value.

Figure 24:
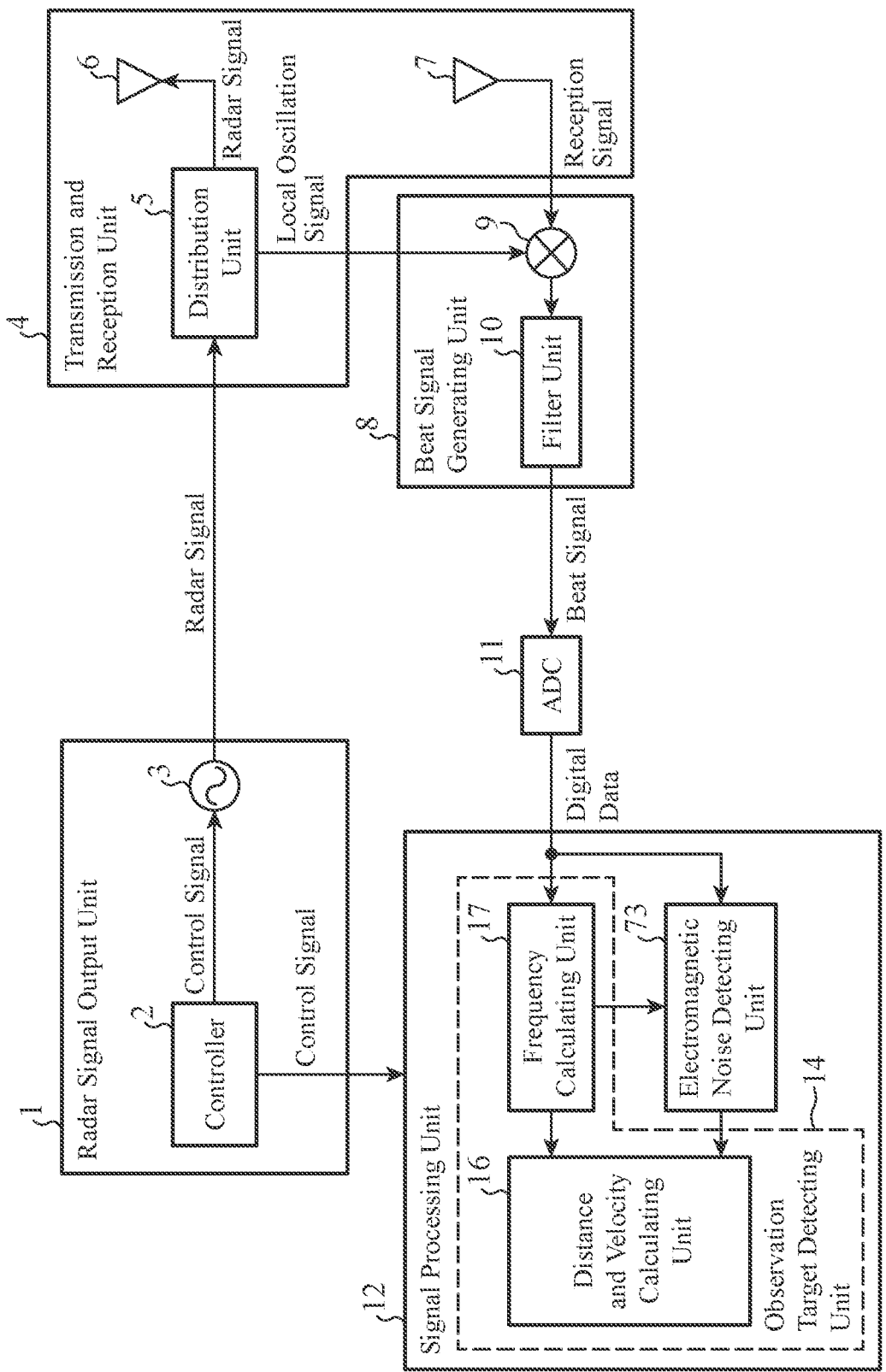
FIG. 24 is a configuration diagram illustrating a radar device according to a seventh embodiment.

FIG. 24 is a configuration diagram illustrating a radar device according to the seventh embodiment. In FIG. 24, the same symbol as that in FIG. 1 represents the same or a corresponding part, and thus description thereof is omitted.

The frequency calculating unit 17 is implemented by, for example, the frequency calculating circuit 22 illustrated in FIG. 2.

Like the frequency calculating unit 15 illustrated in FIG. 1, the frequency calculating unit 17 specifies a period when a radar signal is output from the radar signal output unit 1 by referring to a control signal output from a controller 2.

Like the frequency calculating unit 15 illustrated in FIG. 1, the frequency calculating unit 17 calculates each of beat frequency $F_{sb\_r}$ that corresponds to the distance to an observation target and Doppler frequency $F_{sb\_v}$ that corresponds to the relative velocity with respect to the observation target using digital data in the period that has been specified among digital data output from an ADC 11.

Like the frequency calculating unit 15 illustrated in FIG. 1, the frequency calculating unit 17 outputs each of beat frequency $F_{sb\_r}$ and Doppler frequency $F_{sb\_v}$ to a distance and velocity calculating unit 16.

The frequency calculating unit 17 outputs signal strength $S_{sb}$ related to each of beat frequency $F_{sb\_r}$ and Doppler frequency $F_{sb\_v}$ to the electromagnetic noise detecting unit 73.

The electromagnetic noise detecting unit 73 is implemented by, for example, the electromagnetic noise detecting circuit 21 illustrated in FIG. 2.

Like the electromagnetic noise detecting unit 13 illustrated in FIG. 1, by referring to a control signal output from a controller 2, the electromagnetic noise detecting unit 73 specifies a period when no radar signal is output from a radar signal output unit 1 as a period when no radar signal is transmitted from a transmission and reception unit 4.

The electromagnetic noise detecting unit 73 calculates difference $\Delta S$ between signal strength $S_{sb}$ output from the frequency calculating unit 17 and a fifth threshold value.

The fifth threshold value may be stored in an internal memory of a spectrum calculating unit 46 (see FIG. 25) in the electromagnetic noise detecting unit 73 or may be given from the outside of the device. As the fifth threshold value, for example, a value larger by 3 [dB] than the signal level, at which the electromagnetic noise detecting unit 73 can detect electromagnetic noise, is conceivable. Alternatively, the fifth threshold value may be obtained from a result of performing an electromagnetic noise test in advance.

The electromagnetic noise detecting unit 73 acquires part of digital data out of the digital data in the period that has been specified among the digital data output from the ADC 11 on the basis of difference $\Delta S$.

The electromagnetic noise detecting unit 73 calculates each of frequency $F_{n\_r}$ of the electromagnetic noise input to the ADC 11 and Doppler frequency $F_{n\_v}$ that corresponds to the relative velocity with respect to the source of the electromagnetic noise using the part of digital data that has been acquired.

The electromagnetic noise detecting unit 73 outputs each of electromagnetic noise frequency $F_{n\_r}$ and Doppler frequency $F_{n\_v}$ to the distance and velocity calculating unit 16.

Figure 25:
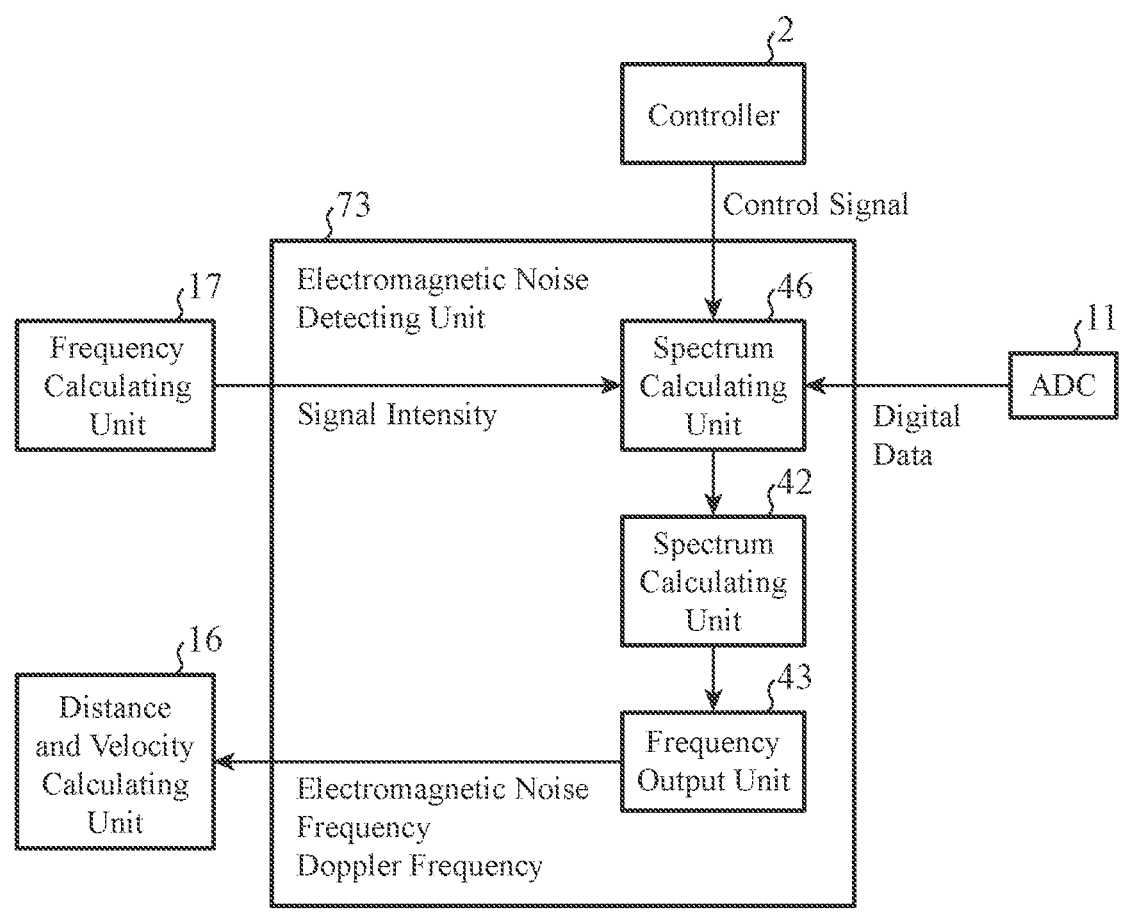
FIG. 25 is a configuration diagram illustrating an electromagnetic noise detecting unit 73 of a signal processing unit 12.

FIG. 25 is a configuration diagram illustrating the electromagnetic noise detecting unit 73 in the signal processing unit 12. In FIG. 21, the same symbol as that in FIG. 5 represents the same or a corresponding part, and thus description thereof is omitted.

Like the spectrum calculating unit 41 illustrated in FIG. 5, a spectrum calculating unit 46 specifies a period when no radar signal is output from the radar signal output unit 1 by referring to the control signal output from the controller 2.

The spectrum calculating unit 46 calculates difference ΔS between signal strength $S_{sb}$ output from the frequency calculating unit 17 and the fifth threshold value.

The spectrum calculating unit 46 acquires part of digital data out of the digital data in the period that has been specified among the digital data output from the ADC 11 on the basis of difference ΔS.

The spectrum calculating unit 46 calculates a first frequency spectrum related to the electromagnetic noise by performing a Fourier transform, in the distance direction, on the part of digital data that has been acquired.

Since digital data in the period that has been specified is repeatedly output from the ADC 11, the spectrum calculating unit 46 acquires part of digital data from each of a plurality of pieces of digital data that is repeatedly output. Then, the spectrum calculating unit 46 calculates a plurality of first frequency spectra related to the electromagnetic noise by performing a Fourier transform, in the distance direction, on each piece of the part of digital data.

The spectrum calculating unit 46 outputs the plurality of first frequency spectra related to the electromagnetic noise that has been calculated to a spectrum calculating unit 42.

Next, the operation of the radar device illustrated in FIG. 24 will be described.

Since the components other than the frequency calculating unit 17 and the electromagnetic noise detecting unit 73 are similar to those in the radar device illustrated in FIG. 1, the operation of the frequency calculating unit 17 and the electromagnetic noise detecting unit 73 will be mainly described here.

Like the frequency calculating unit 15 illustrated in FIG. 1, the frequency calculating unit 17 calculates each of beat frequency $F_{sb\_r}$ that corresponds to the distance to the observation target and Doppler frequency $F_{sb\_v}$ that corresponds to the relative velocity with respect to the observation target.

Like the frequency calculating unit 15 illustrated in FIG. 1, the frequency calculating unit 17 outputs each of beat frequency $F_{sb\_r}$ and Doppler frequency $F_{sb\_v}$ to the distance and velocity calculating unit 16.

The frequency calculating unit 17 outputs signal strength $S_{sb}$ related to each of beat frequency $F_{sb\_r}$ and Doppler frequency $F_{sb\_v}$ to the spectrum calculating unit 46 of the electromagnetic noise detecting unit 73.

Signal strength $S_{sb}$ related to each of beat frequency $F_{sb\_r}$ and Doppler frequency $F_{sb\_v}$ corresponds to a peak value detected by a frequency output unit 53 of the frequency calculating unit 15 illustrated in FIG. 1. Therefore, like the frequency output unit 53 of the frequency calculating unit 15, the frequency calculating unit 17 can detect signal strength $S_{sb}$ by detecting a peak value of spectrum values in a second frequency spectrum.

The spectrum calculating unit 46 specifies the period when no radar signal is output from the radar signal output unit 1 by referring to the control signal output from the controller 2.

When signal strength $S_{sb}$ output from the frequency calculating unit 17 is received, the spectrum calculating unit 46 calculates difference ΔS between signal strength $S_{sb}$ and the fifth threshold value as expressed in Equation 3 below.

$$\Delta S = S_{sb} - \text{fifth threshold value} \tag{3}$$

The spectrum calculating unit 46 acquires part of digital data out of the digital data in the period that has been specified among the digital data output from the ADC 11 on the basis of difference ΔS.

That is, the spectrum calculating unit 46 acquires digital data in a smaller range as difference ΔS is larger from the digital data in the period that has been specified.

Range x of part of digital data is expressed as in Equation 4 below.

$$10 \times \log_{10}(x) = -\Delta S \tag{4}$$

From Equation 4, for example, if ΔS=3, x=1/2, and the spectrum calculating unit 46 acquires digital data in a range that is a half of the digital data in the period that has been specified.

For example, if ΔS=6, x=1/4, and the spectrum calculating unit 46 acquires digital data in a range that is a quarter of the digital data in the period that has been specified.

Even in a case where the spectrum calculating unit 46 acquires part of digital data out of the digital data in the period that has been specified, as long as digital data in a range that satisfies Equation 4 is acquired, the electromagnetic noise detecting unit 73 can detect electromagnetic noise.

The spectrum calculating unit 46 calculates a first frequency spectrum related to the electromagnetic noise by performing a Fourier transform, in the distance direction, on the part of digital data that has been acquired.

Since digital data in the period that has been specified is repeatedly output from the ADC 11, the spectrum calculating unit 46 acquires part of digital data from each of a plurality of pieces of digital data that is repeatedly output. Then, the spectrum calculating unit 46 calculates a plurality of first frequency spectra related to the electromagnetic noise by performing a Fourier transform, in the distance direction, on each piece of the part of digital data.

The spectrum calculating unit 46 outputs the plurality of first frequency spectra related to the electromagnetic noise that has been calculated to the spectrum calculating unit 42.

The spectrum calculating unit 42 acquires the plurality of first frequency spectra output from the spectrum calculating unit 46.

The spectrum calculating unit 42 calculates a second frequency spectrum related to the electromagnetic noise by performing a Fourier transform, in the relative velocity direction, on the plurality of first frequency spectra that have been acquired.

The spectrum calculating unit 42 outputs the second frequency spectrum related to the electromagnetic noise to a frequency output unit 43.

The frequency output unit 43 detects peak values of spectrum values in the second frequency spectrum output from the spectrum calculating unit 42.

The frequency output unit 43 outputs the beat frequency of the peak values that have been detected to the distance and velocity calculating unit 16 as the electromagnetic noise frequency.

The frequency output unit 43 outputs the Doppler frequency of the peak values that have been detected to the distance and velocity calculating unit 16 as a Doppler frequency that corresponds to the relative velocity with respect to the source of the electromagnetic noise.

In the above seventh embodiment, the frequency calculating unit 17 outputs, to the electromagnetic noise detecting unit 73, signal strength $S_{sb}$ related to each of beat frequency $F_{sb\_r}$ that corresponds to the distance to the observation target and Doppler frequency $F_{sb\_v}$ that corresponds to the relative velocity with respect to the observation target. The radar device illustrated in FIG. 24 is configured so that the electromagnetic noise detecting unit 73 acquires part of digital data out of the digital data in the period when no radar signal is output from the radar signal output unit 1 on the basis of difference ΔS between signal strength $S_{sb}$ output from the frequency calculating unit 17 and the fifth threshold value and calculates each of frequency $F_{n\_r}$ of the electromagnetic noise input to the ADC 11 and Doppler frequency $F_{n\_v}$ that corresponds to the relative velocity with respect to the source of the electromagnetic noise using the part of digital data. Therefore, the electromagnetic noise detecting unit 73 of the radar device illustrated in FIG. 24 can reduce the load of the calculation process as compared with the electromagnetic noise detecting unit 13 of the radar device illustrated in FIG. 1.

In the radar device illustrated in FIG. 24, the frequency calculating unit 17 outputs signal strength $S_{sb}$ to the spectrum calculating unit 46 of the electromagnetic noise detecting unit 73, and the spectrum calculating unit 46 acquires the part of digital data on the basis of difference ΔS between signal strength $S_{sb}$ and the fifth threshold value. However, this is merely an example, and the frequency calculating unit 17 may output signal strength $S_{sb}$ to the spectrum calculating unit 42 instead of the spectrum calculating unit 46, or may output signal strength $S_{sb}$ to both of the spectrum calculating unit 46 and the spectrum calculating unit 42.

When signal strength $S_{sb}$ output from the frequency calculating unit 17 is received, the spectrum calculating unit 42 calculates difference ΔS between signal strength $S_{sb}$ and the fifth threshold value.

The spectrum calculating unit 42 acquires some of the first frequency spectra output from the spectrum calculating unit 46 on the basis of difference ΔS and calculates the second frequency spectrum related to the electromagnetic noise by performing a Fourier transform, in the relative velocity direction, on the some of the first frequency spectra. In this case also, the electromagnetic noise detecting unit 73 of the radar device illustrated in FIG. 24 can reduce the load of the calculation process as compared with the electromagnetic noise detecting unit 13 of the radar device illustrated in FIG. 1.

Note that the present invention may include a flexible combination of the embodiments, a modification of any component of the embodiments, or omission of any component in the embodiments.

INDUSTRIAL APPLICABILITY

The present disclosure is suitable for a radar device for detecting an observation target, an observation target detecting method, and an in-vehicle device.

REFERENCE SIGNS LIST

1: radar signal output unit, 2: controller, 3: signal source, 4: transmission and reception unit, 5: distribution unit, 6: transmission antenna, 7: reception antenna, 8: beat signal generating unit, 9: frequency mixing unit, 10: filter unit, 11: ADC, 12: signal processing unit, 13: electromagnetic noise detecting unit, 14: observation target detecting unit, 15, 17: frequency calculating unit, 16: distance and velocity calculating unit, 21: electromagnetic noise detecting circuit, 22: frequency calculating circuit, 23: distance and velocity calculating circuit, 31: memory, 32: processor, 41, 44, 46: spectrum calculating unit, 42, 45: spectrum calculating unit, 43: frequency output unit, 51: spectrum calculating unit, 52: spectrum calculating unit, 53: frequency output unit, 61: controller, 62, 63: switch, 71, 72, 73: electromagnetic noise detecting unit, 80: radar signal output unit, 81: controller, 90: radar device, 91: control unit

The invention claimed is:

1. A radar device comprising:
processing circuitry performing a process of:
generating a beat signal when a frequency-modulated signal, whose frequency changes with passage of time, is intermittently and repeatedly transmitted as a radar signal and the radar signal reflected by an observation target is received as a reflection wave in a period when the radar signal is transmitted, the beat signal having a frequency that is a difference between a frequency of the radar signal that has been transmitted and a frequency of the reflection wave;
converting the beat signal generated into digital data and outputting the digital data;
detecting electromagnetic noise input using digital data in a period when no radar signal is transmitted, among the digital data output; and
detecting the observation target using digital data in the period when the radar signal has been transmitted, among the digital data output, and the electromagnetic noise detected;
intermittently and repeatedly outputting a frequency-modulated signal whose frequency changes with passage of time as a radar signal; and
transmitting the radar signal output toward the observation target, receiving the radar signal reflected by the observation target as a reflection wave, and outputting each of the radar signal output and the reflection wave,
wherein the process calculates each of a frequency of the electromagnetic noise input and a Doppler frequency that corresponds to a relative velocity with respect to a source of the electromagnetic noise using the digital data in the period when no radar signal is output, among the digital data output, and
calculating each of a beat frequency that corresponds to a distance to the observation target and a Doppler frequency that corresponds to a relative velocity with respect to the observation target using the digital data in the period when the radar signal is output among the digital data output; and
calculating each of the distance to the observation target and the relative velocity with respect to the observation target using the beat frequency calculated, the Doppler frequency calculated, the frequency of the electromagnetic noise calculated, and the Doppler frequency calculated.

2. The radar device according to claim 1,
wherein the process changes a frequency bandwidth of the radar signal that is repeatedly output or sweep time of the radar signal that is repeatedly output if a difference between a beat frequency that corresponds to the distance to the observation target calculated, among beat frequencies calculated, and the electromagnetic noise frequency calculated is less than or equal to a third threshold value and a difference between a Doppler frequency that corresponds to the relative velocity with respect to the observation target calculated, among Doppler frequencies calculated, and the Doppler frequency calculated is less than or equal to a fourth threshold value.

3. The radar device according to claim 1,
wherein the process calculates a first frequency spectrum related to the electromagnetic noise input by performing a Fourier transform, in a distance direction, on the digital data in the period when no radar signal is output among the digital data output and calculates each of the frequency of the electromagnetic noise input and the Doppler frequency that corresponds to the relative velocity with respect to the source of the electromagnetic noise by performing a Fourier transform, in a relative velocity direction, on spectrum values of the beat frequency calculated among a plurality of spectrum values included in the first frequency spectrum.

4. The radar device according to claim 1,
wherein the process outputs signal strength related to each of the beat frequency that corresponds to the distance to the observation target and the Doppler frequency that corresponds to the relative velocity with respect to the observation target, and
the process acquires part of digital data out of the digital data in the period when no radar signal is output on a basis of a difference between a signal strength output and a fifth threshold value and calculates each of the frequency of the electromagnetic noise input and the Doppler frequency that corresponds to the relative velocity with respect to the source of the electromagnetic noise using the part of digital data.

5. A radar device comprising:
processing circuitry performing a process of:
generating a beat signal when a frequency-modulated signal, whose frequency changes with passage of time, is intermittently and repeatedly transmitted as a radar signal and the radar signal reflected by an observation target is received as a reflection wave in a period when the radar signal is transmitted, the beat signal having a frequency that is a difference between a frequency of the radar signal that has been transmitted and a frequency of the reflection wave;
converting the beat signal generated into digital data and outputting the digital data;
detecting electromagnetic noise input using digital data in a period when no radar signal is transmitted, among the digital data output;
detecting the observation target using digital data in the period when the radar signal has been transmitted, among the digital data output and the electromagnetic noise detected;
outputting a frequency-modulated signal whose frequency changes with passage of time as a radar signal;
transmitting the radar signal output toward the observation target, receiving the radar signal reflected by the observation target as a reflection wave, and outputting each of the radar signal output and the reflection wave; and
repeatedly switching between connection and disconnection between the radar signal output and the transmission and reception;
wherein the process transmits the radar signal output to the observation target when connected with via the switch and outputs each of the radar signal output and the reflection wave,
wherein the process calculates each of a frequency of the electromagnetic noise input and a Doppler frequency that corresponds to a relative velocity with respect to a source of the electromagnetic noise using the digital data in the period when no radar signal is output, among the digital data output, and
calculating each of a beat frequency that corresponds to a distance to the observation target and a Doppler frequency that corresponds to a relative velocity with respect to the observation target using the digital data in the period when the radar signal is output among the digital data output; and
calculating each of the distance to the observation target and the relative velocity with respect to the observation target using the beat frequency calculated, the Doppler frequency calculated, the frequency of the electromagnetic noise calculated, and the Doppler frequency calculated.

6. The radar device according to claim 5,
wherein, in a case where one or more Doppler frequencies are calculated, the process performs each of the calculation process of the frequency of the electromagnetic noise input and the calculation process of the Doppler frequency that corresponds to the relative velocity with respect to the source of the electromagnetic noise if a relative velocity indicated by any of the Doppler frequencies among the one or more Doppler frequencies is less than or equal to a first threshold value, and performs neither the calculation process of the frequency of the electromagnetic noise input nor the calculation process of the Doppler frequency that corresponds to the relative velocity with respect to the source of the electromagnetic noise if all of relative velocities indicated by the one or more Doppler frequencies are greater than the first threshold value.

7. The radar device according to claim 5,
wherein, in a case where one or more Doppler frequencies are calculated, the process performs each of the calculation process of the frequency of the electromagnetic noise input and the calculation process of the Doppler frequency that corresponds to the relative velocity with respect to the source of the electromagnetic noise if a difference between a relative velocity indicated by any of the one or more Doppler frequencies and a traveling velocity of the radar device is less than or equal to a second threshold value and, if all differences between respective relative velocities indicated by the respective Doppler frequencies calculated and the traveling velocity of the radar device are greater than the second threshold value, performs neither the calculation process of the frequency of the electromagnetic noise input nor the calculation process of the Doppler frequency that corresponds to the relative velocity with respect to the source of the electromagnetic noise.

8. The radar device according to claim 5,
wherein the process outputs each of the distance to the observation target and the relative velocity with respect to the observation target calculated to a control unit of an automobile and outputs each of the beat frequency and the Doppler frequency calculated.

9. An observation target detecting method comprising:
when a frequency-modulated signal, whose frequency changes with passage of time, is intermittently and repeatedly transmitted as a radar signal, the radar signal reflected by an observation target is received as a reflection wave in a period when the radar signal is transmitted, a beat signal having a frequency that is a difference between a frequency of the radar signal that has been transmitted and a frequency of the reflection wave is generated, and the beat signal is converted into digital data and the digital data is output,
detecting electromagnetic noise input using digital data in a period when no radar signal is transmitted, among the digital data output; and
detecting the observation target using digital data in the period when the radar signal has been transmitted, among the digital data output, and the electromagnetic noise detected wherein the process calculates each of a frequency of the electromagnetic noise input and a Doppler frequency that corresponds to a relative velocity with respect to a source of the electromagnetic noise using the digital data in the period when no radar signal is output, among the digital data output, and calculating each of a beat frequency that corresponds to a distance to the observation target and a Doppler frequency that corresponds to a relative velocity with respect to the observation target using the digital data in the period when the radar signal is output among the digital data output; and calculating each of the distance to the observation target and the relative velocity with respect to the observation target using the beat frequency calculated, the Doppler frequency calculated, the frequency of the electromagnetic noise calculated, and the Doppler frequency calculated.

10. An in-vehicle device comprising a radar device for detecting an observation target, wherein the radar device includes:

a first processing circuitry performing a first process of:

generating a beat signal when a frequency-modulated signal, whose frequency changes with passage of time, is intermittently and repeatedly transmitted as a radar signal and the radar signal reflected by an observation target is received as a reflection wave in a period when the radar signal is transmitted, the beat signal having a frequency that is a difference between a frequency of the radar signal that has been transmitted and a frequency of the reflection wave;

converting the beat signal generated into digital data and outputting the digital data;

detecting electromagnetic noise input using digital data in a period when no radar signal is transmitted, among the digital data output; and detecting the observation target using digital data in the period when the radar signal has been transmitted, among the digital data output, and the electromagnetic noise detected intermittently and repeatedly outputting a frequency-modulated signal whose frequency changes with passage of time as a radar signal; and transmitting the radar signal output toward the observation target, receiving the radar signal reflected by the observation target as a reflection wave, and outputting each of the radar signal output and the reflection wave, wherein the first process calculates each of a frequency of the electromagnetic noise input and a Doppler frequency that corresponds to a relative velocity with respect to a source of the electromagnetic noise using the digital data in the period when no radar signal is output, among the digital data output, and the observation target detector includes:

a second processing circuitry performing a second process of:

calculating each of a beat frequency that corresponds to a distance to the observation target and a Doppler frequency that corresponds to a relative velocity with respect to the observation target using the digital data in the period when the radar signal is output among the digital data output; and calculating each of the distance to the observation target and the relative velocity with respect to the observation target using the beat frequency calculated, the Doppler frequency calculated, the frequency of the electromagnetic noise calculated, and the Doppler frequency calculated.

* * * * *